(12) United States Patent
Sugiyama et al.

(10) Patent No.: US 9,513,600 B2
(45) Date of Patent: Dec. 6, 2016

(54) DISPLAY DEVICE USING COMPUTER GENERATED HOLOGRAM

(71) Applicant: Panasonic Corporation, Osaka (JP)

(72) Inventors: Keiji Sugiyama, Kyoto (JP); Kenichi Kasazumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 233 days.

(21) Appl. No.: 14/368,947

(22) PCT Filed: Nov. 5, 2013

(86) PCT No.: PCT/JP2013/006524
§ 371 (c)(1),
(2) Date: Jun. 26, 2014

(87) PCT Pub. No.: WO2014/073201
PCT Pub. Date: May 15, 2014

(65) Prior Publication Data
US 2014/0355086 A1 Dec. 4, 2014

(30) Foreign Application Priority Data

Nov. 8, 2012 (JP) ................. 2012-246148

(51) Int. Cl.
*G03H 1/08* (2006.01)
*G03H 1/22* (2006.01)
*G02B 27/01* (2006.01)

(52) U.S. Cl.
CPC .......... *G03H 1/2294* (2013.01); *G02B 27/017* (2013.01); *G02B 27/0172* (2013.01);
(Continued)

(58) Field of Classification Search
CPC .................. G03H 1/268; G03H 2001/0061; G03H 1/22; G03H 1/2202; G03H 1/2205; G03H 2001/221; G03H 2001/2223; G03H 2001/2234; G03H 2001/2231; H04N 13/0425
USPC ........ 382/210, 117; 359/9, 1, 13, 14, 21, 32, 359/33, 35; 351/210; 250/550; 356/347; 348/40
See application file for complete search history.

(56) References Cited

U.S. PATENT DOCUMENTS

| 7,317,564 B2 * | 1/2008 | Payne .................. G02B 5/32 359/32 |
| 2006/0250671 A1 | 11/2006 | Schwerdtner et al. |

(Continued)

FOREIGN PATENT DOCUMENTS

| JP | 5-210069 | 8/1993 |
| JP | 8-240773 | 9/1996 |

(Continued)

OTHER PUBLICATIONS

International Search Report issued Dec. 10, 2013 in International (PCT) Application No. PCT/JP2013/006524.

*Primary Examiner* — Arnel C Lavarias
(74) *Attorney, Agent, or Firm* — Wenderoth, Lind & Ponack, L.L.P.

(57) ABSTRACT

A display device including a pattern generator configured to generate a diffraction pattern from an image; a light source configured to emit emission light; an optical condenser which condenses the emission light to generate illumination light; and a spatial light modulator which diffracts the illumination light according to the diffraction pattern to generate diffracted light. The diffracted light passes through the optical condenser.

1 Claim, 27 Drawing Sheets

(52) U.S. Cl.
CPC ....... *G03H1/2205* (2013.01); *G02B 2027/014* (2013.01); *G02B 2027/015* (2013.01); *G02B 2027/0174* (2013.01); *G02B 2027/0178* (2013.01); *G03H 2001/221* (2013.01); *G03H 2001/2284* (2013.01); *G03H 2227/02* (2013.01); *G03H 2270/55* (2013.01)

(56) References Cited

U.S. PATENT DOCUMENTS

| | | |
|---|---|---|
| 2007/0183011 A1 | 8/2007 | Yamauchi et al. |
| 2008/0192312 A1 | 8/2008 | Hendricks et al. |
| 2009/0225380 A1 | 9/2009 | Schwerdtner et al. |
| 2010/0014136 A1* | 1/2010 | Haussler .......... G03H 1/02 359/15 |
| 2011/0176190 A1* | 7/2011 | Golan .............. G03H 1/08 359/9 |
| 2013/0106847 A1 | 5/2013 | Sugiyama et al. |

FOREIGN PATENT DOCUMENTS

| | | |
|---|---|---|
| JP | 2007-219491 | 8/2007 |
| JP | 2008-16161 | 1/2008 |
| JP | 2008-145546 | 6/2008 |
| JP | 2008-233875 | 10/2008 |
| JP | 2008-541145 | 11/2008 |
| JP | 2011-35899 | 2/2011 |
| WO | 2012/147271 | 11/2012 |

* cited by examiner

FIG. 6
(REGION OF IMAGE)
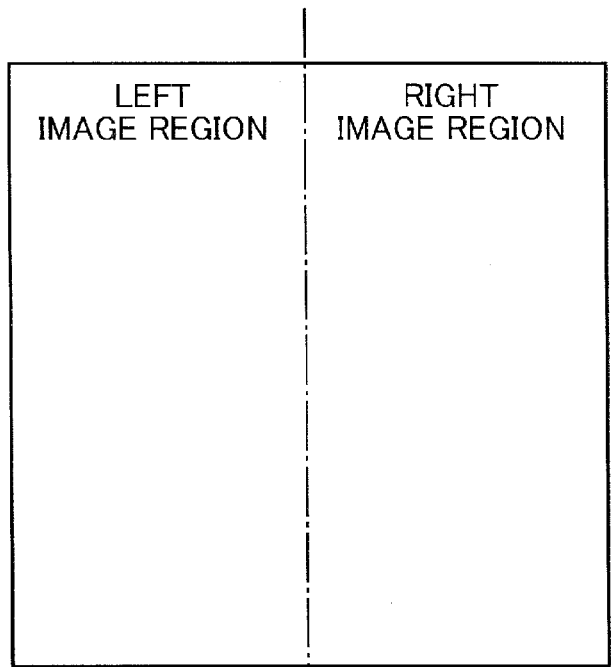
| LEFT IMAGE REGION | RIGHT IMAGE REGION |
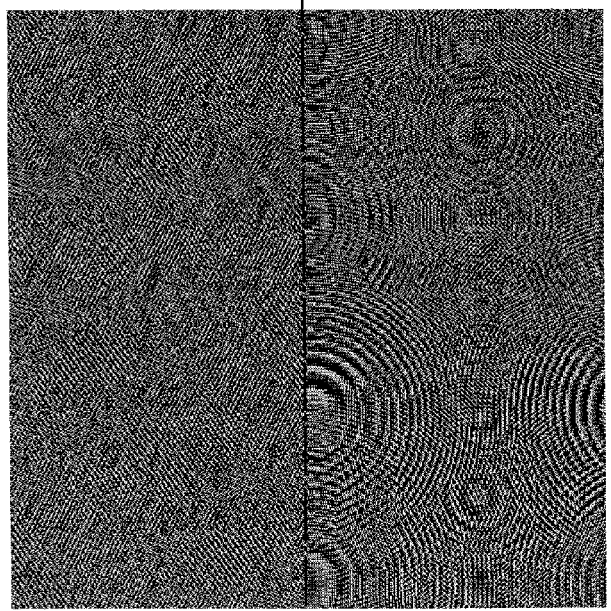
LEFT DIFFRACTION PATTERN | RIGHT DIFFRACTION PATTERN
—BL
(DIFFRACTION PATTERN)

FIG. 7 (PHASE PATTERN)

($\alpha \neq \beta$)

($\gamma \neq \beta$)

(IMAGE REPRESENTED BY IMAGE DATA OR IMAGE OBSERVED BY USER)

(DIFFRACTION PATTERN)

FIG. 26
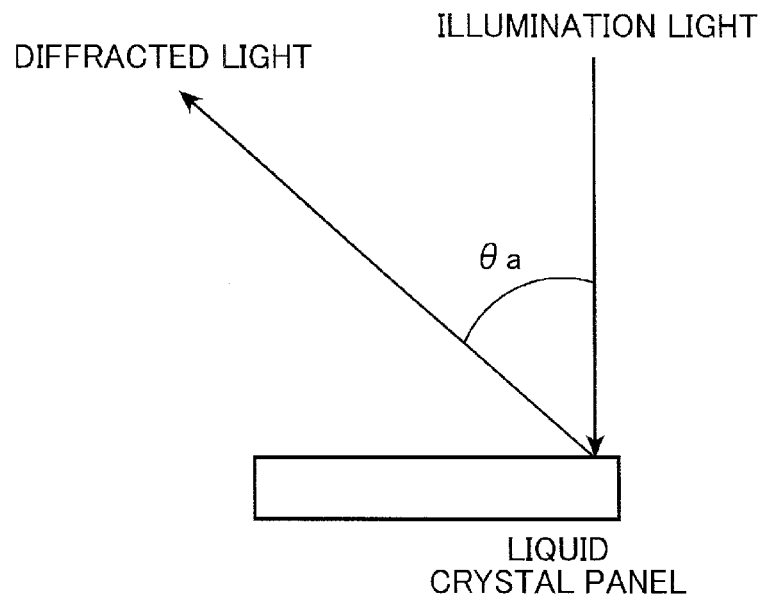
FIG. 27 - PRIOR ART
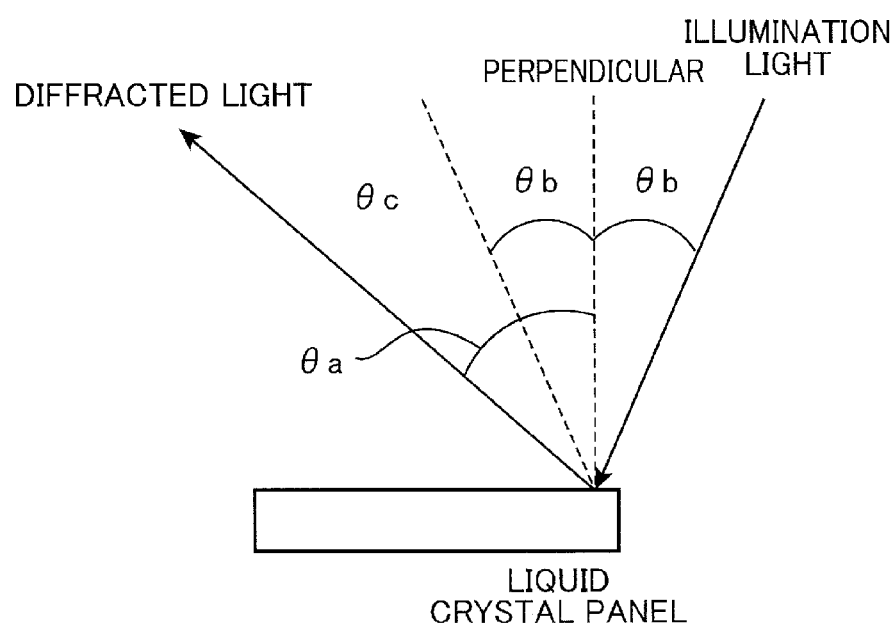

DISPLAY DEVICE USING COMPUTER GENERATED HOLOGRAM

TECHNICAL FIELD

The present invention relates to a display device which uses a computer generated hologram to diffract a laser beam and display an image.

BACKGROUND ART

Various display devices for displaying images have been developed. For example, a head-mounted display (hereinafter referred to as "HMD") is exemplified as these display devices.

A user wears the HMD on the head. The HMD displays an image in front of the eyes of the user to provide the user with information. In general, it is desired in terms of wearability that the HMD is small and lightweight.

A conventional HMD includes a small liquid crystal panel and an optical magnifier (e.g. a convex lens or a free curve prism). The magnifier magnifies an image to be displayed by the liquid crystal panel. Accordingly, a magnified virtual image is observed by a user (c.f. Patent Document 1). In the following description, display techniques for magnifying an image using the magnifier is referred to as "optical magnification system".

A display device with a computer generated hologram (hereinafter referred to as "CGH") is exemplified as another display technique (c.f. Patent Document 2). For example, the display device includes a light source, a liquid crystal panel of a phase modulation type, and a computer for creating a computer generated hologram. When image data is input to the computer, the computer calculates a diffraction pattern. The display device displays the diffraction pattern on the liquid crystal panel as the CGH. When the light source emits a laser beam to the liquid crystal panel, a wave front of display light is reproduced from a virtual image position. Accordingly, a user may observe a virtual image.

Unlike the optical magnification system, the display technique using the CGH does not require a magnifier such as a prism. Therefore, if the CGH is used, it is possible to design a small optical system. Accordingly, a small HMD may be manufactured under use of the CGH.

(Image Display Method Using CGH)

FIG. 24A is an exemplary image represented by image data input to the computer. FIG. 24B is an exemplary diffraction pattern in correspondence to the image data shown in FIG. 24A. An image display method using a CGH is described with reference to FIGS. 24A and 24B.

The display device using the CGH calculates a diffraction pattern from the image data. Image generation techniques using a point filling method or Fourier transform are exemplified as calculation techniques for the diffraction pattern. For example, the display device may generate the diffraction pattern shown in FIG. 24B from the image data representing the image shown in FIG. 24A. The display device displays the generated diffraction pattern on the liquid crystal panel (e.g. a phase modulation type) as the CGH. When the display device irradiates a laser beam on the liquid crystal panel which displays the CGH, the liquid crystal panel diffracts the laser beam according to the diffraction pattern. Accordingly, a user may observe the diffracted laser beam as the image shown in FIG. 24A.

(Generation Method for Diffraction Pattern)

FIG. 25 is a conceptual view of a generation method for a diffraction pattern according to the point filling method. The generation method for a diffraction pattern is described with reference to FIG. 25.

FIG. 25 shows an image represented by image data and a $\xi$-$\eta$ coordinate set on the liquid crystal panel. The origin of the $\xi$-$\eta$ coordinate is coincident with the center of the liquid crystal panel.

If the point filling method is used, the image represented by the image data is regarded as a set of point light sources. In FIG. 25, a point i on the image is shown. A diffraction pattern is calculated from a phase at the time when emission light emitted from a point on the image overlaps a point on the liquid crystal panel.

The following formula represents a complex amplitude ui ($\xi$,$\eta$) of light which reaches a point u from the point i.

$$ui(\xi, \eta) = \frac{\alpha i}{ri} \exp\{-j(kri + \phi i)\} \qquad \text{[Formula 1]}$$

It should be noted that the symbol "$\alpha i$" in the aforementioned formula represents amplitude of light at the point i. The symbol "$\phi i$" represents a phase of the light at the point i. It should be noted that the phase "$\phi i$" may be a random phase value added to the image The symbol "k" represents a wave number. If a wavelength of light emitted from the point i is represented by the symbol "$\lambda$", the wave number "k" is represented by "$2\pi/\lambda$". The symbol "ri" represents a distance between the point i and the point u. The distance "ri" is represented by the following formula.

$$ri = \sqrt{(\xi-xi)^2 + (\eta-yi)^2 + zi^2} \qquad \text{[Formula 2]}$$

It should be noted that the coordinate of the point i is represented by (xi, yi, zi) in the aforementioned formula. The coordinate of the point u is represented by ($\xi$, $\eta$, 0).

Complex amplitude of light reaching the point u from each of all points on the image is represented as a sum of complex amplitudes of lights reaching the point u from the points on the image. The following formula represents the complex amplitude of the light reaching the point u from each of all the points on the image.

$$u(\xi, \eta) = \sum_{i=1}^{N} ui(\xi, \eta) \qquad \text{[Formula 3]}$$

The calculation of the aforementioned formula is executed on all points on the liquid crystal panel. Accordingly, a diffraction pattern is generated. It should be noted that a phase change resultant from reference light is not shown in the calculation according to the point filling method, in order to simplify description about the principle of the point filling method.

As described above, if the diffraction pattern is calculated by means of the point filling method, a wave front from an arbitrary object is reproduced. Therefore, unlike the conventional optical magnification system, a position of a reproduced image which a user observes is appropriately controlled without a magnifier such as a prism.

(Problem about Angle of View)

The display device using the CGH faces a problem about a small angle of view of a reproduced image.

FIG. 26 shows the liquid crystal panel, illumination light for illuminating the liquid crystal panel, and diffracted light which is diffracted by the liquid crystal panel. The problem about the angle of view is described with reference to FIG. 26.

The liquid crystal panel shown in FIG. 26 displays a CGH. When the illumination light is irradiated on the liquid crystal panel, the liquid crystal panel generates diffracted light in correspondence to the CGH. It should be noted that the CGH generates several kinds of diffracted light different in orders. However, only primary diffracted light is shown in FIG. 26.

The following formula represents an angle between the diffracted light and a perpendicular line of the liquid crystal panel (i.e. an angle of diffraction θa). It should be noted that a pixel pitch of the liquid crystal display panel is represented by the symbol "p". A wavelength of the illumination light is represented by the symbol "λ".

$$\theta a = \frac{\lambda}{2p}$$ [Formula 4]

It is figured out from the aforementioned formula that the small pixel pitch "p" results in the large angle of diffraction θa. In general, if a diffractable range of the diffracted light from the liquid crystal panel is large, an angle of view and a vision of a reproduced image are easily magnified. However, it is difficult to create a pixel pitch smaller than 6 μm according to current manufacturing techniques for liquid crystal panels. In short, there is a limit in obtaining a large angle of diffraction θa by using the pixel pitch.

The illumination light shown in FIG. 26 is collimated light perpendicular to the liquid crystal panel. Unlike the techniques shown in FIG. 26, Patent Document 3 proposes to change an incident angle of the illumination light irradiated on the liquid crystal panel in order to obtain a large angle of diffraction.

FIG. 27 shows setting techniques for an angle of diffraction proposed by Patent Document 3. The setting techniques for an angle of diffraction proposed by Patent Document 3 are described with reference to FIGS. 26 and 27.

Like FIG. 26, FIG. 27 shows diffracted light, which is inclined by an angle "θa" from the perpendicular line of the liquid crystal panel. Unlike FIG. 26, the illumination light is inclined by an angle "θb" from the perpendicular line of the liquid crystal panel. In this case, the liquid crystal panel diffracts the illumination light by an angle "θc" equivalent to a difference between the angles "θa" and "θb". If the illumination light is inclined from the perpendicular line of the liquid crystal panel, an angle of diffraction required for the liquid crystal panel decreases. Therefore, a wide angle of view is obtained by using a factor different from the pixel pitch.

The setting techniques for an angle of diffraction described with reference to FIG. 27 are easily realized by using convergent light as the illumination light. However, if the convergent light is used as the illumination light, a large optical system is required.

FIG. 28 is a schematic view of an optical system 900 configured to generate convergent light. The optical system 900 is described with reference to FIG. 28.

The optical system 900 includes a light source 910, a condensing lens 920 and a liquid crystal panel 930. The light source 910 emits emission light EML. The emission light EML is divergent light. The condensing lens 920 changes the emission light EML to convergent light CVL. The convergent light CVL enters the liquid crystal panel 930. The liquid crystal panel 930 displays a CGH. Therefore, the liquid crystal panel 930 diffracts the convergent light CVL to generate diffracted light DFL.

FIG. 29 is a schematic view showing a relationship of sizes between the condensing lens 920 and the liquid crystal panel 930. The relationship of sizes between the condensing lens 920 and the liquid crystal panel 930 is described with reference to FIG. 29.

A diameter of the condensing lens 920 is represented by the symbol "W". A diameter of the liquid crystal panel 930 is represented by the symbol "D". The convergent light CVL is inclined by an angle "θb" from the perpendicular line NL to the liquid crystal panel 930. A distance between the condensing lens 920 and the liquid crystal panel 930 is represented by the symbol "L". The following formula represents the diameter "W" of the condensing lens 920.

$$W = 2 \times L \times \tan \theta b + D$$ [Formula 5]

As described above, an increase in the angle "θb" of the convergent light CVL may be considered as a method of increasing an angle of diffraction. However, it is figured out from the aforementioned formula that the large angle "θb" results in the large diameter "W" of the condensing lens 920. The long distance between the condensing lens 920 and the liquid crystal panel 930 also results in the large diameter "W" of the condensing lens 920. It is figured out from these optical perceptions that the conventional techniques are likely to require a large optical system. However, the large optical system is unsuitable for an application to a wearable display device such as an HMD in terms of an external appearance.

Patent Document 1: JP H8-240773 A
Patent Document 2: JP 2008-541145 A
Patent Document 3: JP 2011-35899 A

SUMMARY OF THE INVENTION

It is an object of the present invention to provide a display device which displays an image using a small optical system.

A display device according to one aspect of the present invention includes: a pattern generator configured to generate a diffraction pattern from an image; a light source configured to emit emission light; an optical condenser which condenses the emission light to generate illumination light; and a spatial light modulator which diffracts the illumination light according to the diffraction pattern to generate diffracted light. The diffracted light passes through the optical condenser.

The display device of the present invention is designed so that the diffracted light passes through the optical condenser. Therefore, the display device may use a small optical system to display an image.

Objects, features, and advantages of the present invention are made more apparent by the following detailed description and accompanying drawings.

BRIEF DESCRIPTION OF THE DRAWINGS

FIG. 6 is a schematic view showing an exemplary relationship between an image represented by image data and a diffraction pattern.

FIG. 26 shows a liquid crystal panel, illumination light for illuminating the liquid crystal panel and diffracted light which is diffracted by the liquid crystal panel.

FIG. 27 shows setting techniques for an angle of diffraction proposed by Patent Document 3.

DETAILED DESCRIPTION OF THE INVENTION

Various embodiments about a display device configured to display an image are described below with reference to the accompanying drawings. The display device may be clearly understood by the following description. Directional terms such as "up", "down", "left" and "right" are simply used for clarifying description. Therefore, these terms should not be limitedly interpreted.

<First Embodiment>

Figure 1:
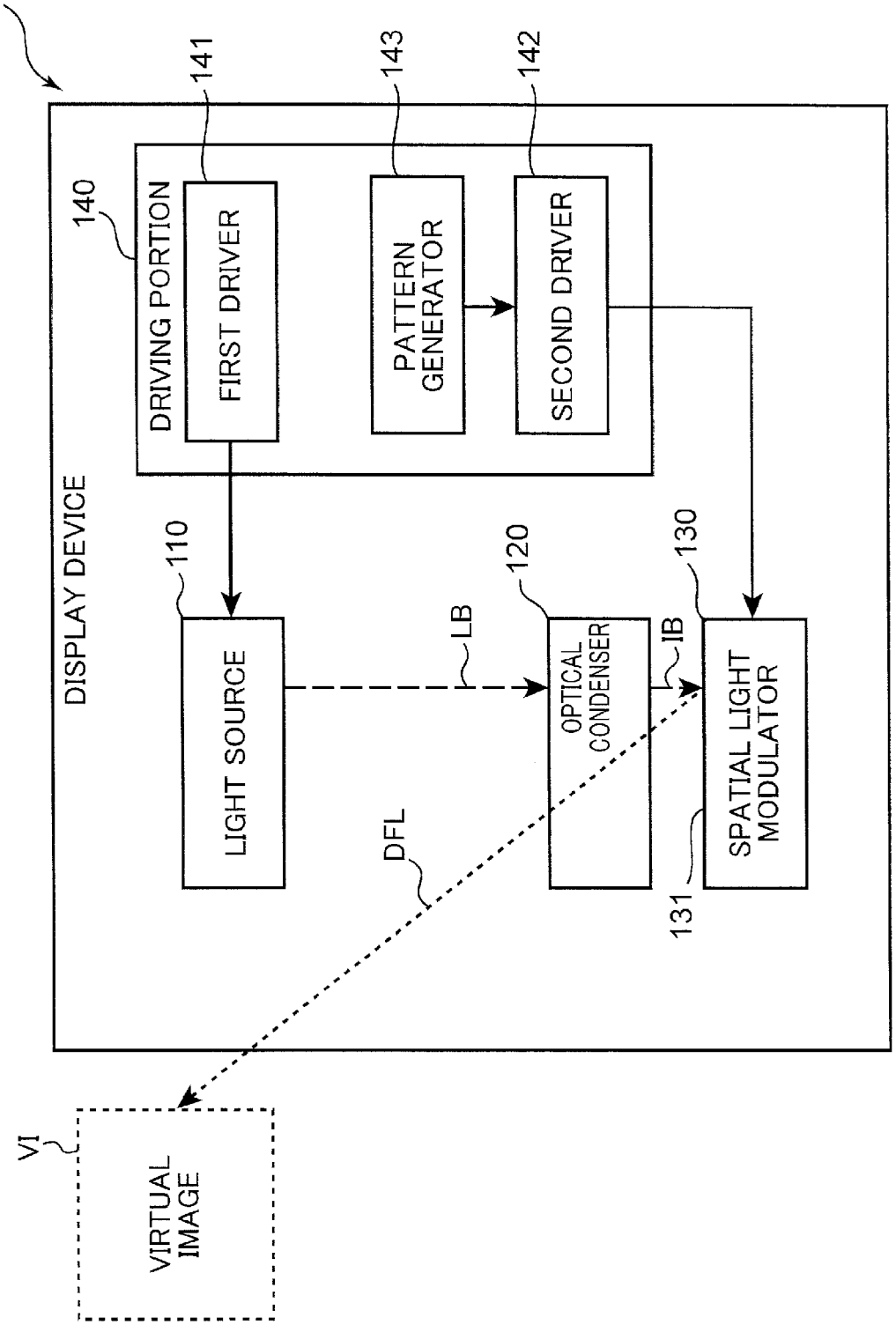
FIG. 1 is a schematic block diagram of a display device according to the first embodiment.

FIG. 1 is a schematic block diagram of the display device 100 according to the first embodiment. The display device 100 is described with reference to FIG. 1.

The display device 100 includes a light source 110, an optical condenser 120, a spatial light modulator 130, and a driving portion 140. The driving portion 140 drives the light source 110 and the spatial light modulator 130. The light source 110 driven by the driving portion 140 emits a laser beam LB to the optical condenser 120. The optical condenser 120 generates illumination light LB from the laser beam LB, so that illumination light IB is condensed toward the spatial light modulator 130. The spatial light modulator 130 reflects the illumination light IB to generate diffracted light DFL. The diffracted light DFL which is diffracted by the spatial light modulator 130 passes through the optical condenser 120. An observer may observe a virtual image VI represented by the diffracted light DFL passing through the optical condenser 120. In this embodiment, the laser beam LB emitted from the light source 110 is exemplified as the emission light.

The driving portion 140 includes a first driver 141, a second driver 142 and a pattern generator 143. The first driver 141 generates first driving signals for driving the light source 110. The first driving signals are output from the first driver 141 to the light source 110. The light source 110 emits the laser beam LB in response to the first driving signals. The pattern generator 143 generates pattern data representing a diffraction pattern from image data showing an image. The pattern data is output from the pattern generator 143 to the second driver 142. The second driver 142 generates second driving signals according to the pattern data to drive the spatial light modulator 130. The second driving signals are output from the second driver 142 to the spatial light modulator 130. The spatial light modulator 130 displays a CGH in correspondence to the diffraction pattern in response to the second driving signals. The CGH of the spatial light modulator 130 diffracts the illumination light IB to generate the diffracted light DFL when the illumination light IB enters the spatial light modulator 130. Accordingly, the observer may observe the virtual image VI in correspondence to the image.

The light source 110 may be a general laser source configured to emit the laser beam LB. For example, a semiconductor laser (a laser diode) configured to emit a laser beam with a green wavelength may be used as the light source 110. Alternatively, the light source 110 may emit a red laser beam and a blue laser beam. The light source 110 may emit a red laser beam, a green laser beam and a blue laser beam. In this case, the light source 110 may include a multiplexer (not shown) for multiplexing the red, green and blue laser beams. Accordingly, the observer may observe the virtual image VI with a plurality of hues.

If the light source 110 emits the red, green and blue laser beams, the first driver 141 may drive the light source 110 in a time division manner. In this case, the observer may also observe the virtual image VI with a plurality of hues.

The light source 110 may be a laser device other than a semiconductor laser. Alternatively, the light source 110 may be a combination of a semiconductor laser and other optical elements. For example, the light source 110 may be a combination of a semiconductor laser configured to emit an infrared ray and an SHG element (a second harmonic generating element) which converts the infrared ray into a green laser beam. The principle of this embodiment is not limited by a structure and characteristics of the light source 110 at all.

Figure 2:
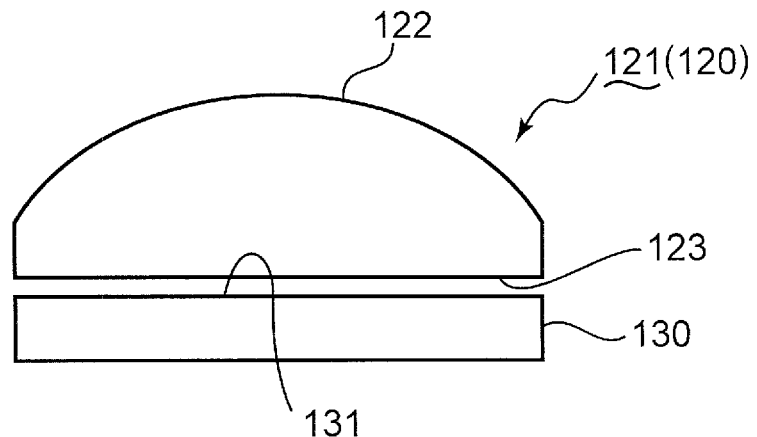
FIG. 2 is a schematic view of a planoconvex lens exemplified as an optical condenser of the display device shown in FIG. 1.

FIG. 2 is a schematic view of a planoconvex lens 121 exemplified as the optical condenser 120. The optical condenser 120 is described with reference to FIGS. 1 and 2.

In this embodiment, the planoconvex lens 121 may be suitably used as the optical condenser 120. The planoconvex lens 121 includes a first surface 122 into which the laser beam LB enters and a second surface 123 opposite to the first surface 122. The second surface 123 is flat whereas the first surface 122 is a curved convex surface.

The laser beam LB enters the first surface 122. While the laser beam LB travels from the first surface 122 to the second surface 123, the planoconvex lens 121 changes the laser beam LB to the illumination light IB. The illumination light IB is propagated from the planoconvex lens 121 to the spatial light modulator 130. The spatial light modulator 130 includes a display surface 131 on which a CGH is displayed. The CGH on the display surface 131 illuminated by the illumination light IB generates the diffracted light DFL. The illumination light IB is generated from the laser beam LB passing through the planoconvex lens 121. Therefore, the illumination light IB is convergent light. As described above, if the illumination light IB is the convergent light, a wide angle of view is obtained even if the spatial light modulator 130 changes the illumination light IB to the diffracted light DFL under a small angle of diffraction.

The second surface 123 of the planoconvex lens 121 is situated next to the display surface 131. The second surface 123 may be set in contact with the display surface 131 or may be slightly apart from the display surface 131.

The planoconvex lens 121 may be fixed to the spatial light modulator 130 by adhesive. Alternatively, the planoconvex lens 121 may be fixed to the spatial light modulator 130 by fixtures such as screws. The principle of this embodiment is not limited by fixing techniques between the planoconvex lens 121 and the spatial light modulator 130 at all.

Figure 3:
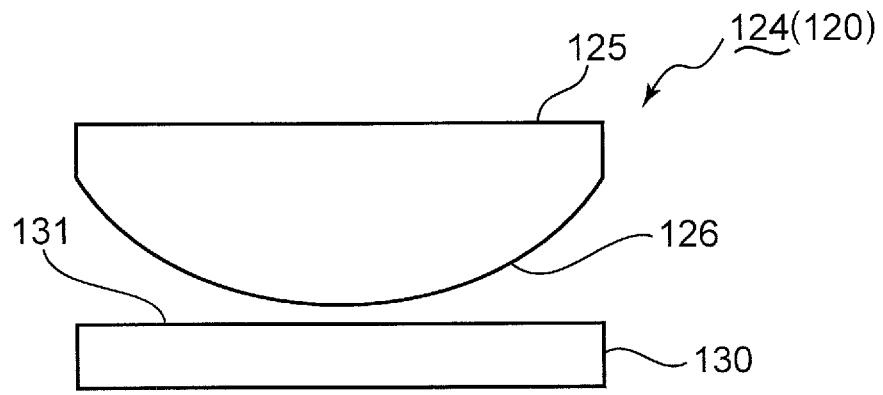
FIG. 3 is a schematic view of another planoconvex lens exemplified as the optical condenser of the display device shown in FIG. 1.

FIG. 3 is a schematic view of a planoconvex lens 124 exemplified as the optical condenser 120. The optical condenser 120 is described with reference to FIGS. 1 to 3.

Like the planoconvex lens 121 described with reference to FIG. 2, the planoconvex lens 124 may be suitably used as the optical condenser 120. The planoconvex lens 124 includes a first surface 125 into which the laser beam LB enters and a second surface 126 opposite to the first surface 125. Unlike the planoconvex lens 121 described with reference to FIG. 2, the second surface 126 is a curved convex surface whereas the first surface 125 is flat.

The light source 110 emits the laser beam LB as divergent light. The laser beam LB enters into the first surface 125. The flat first surface 125 refracts the laser beam LB from the light source 110. Therefore, a curvature of the second surface 126 may be smaller than a curvature of the first surface 122 of the planoconvex lens 121 described with reference to FIG. 2. Therefore, if the planoconvex lens 124 is used instead of the planoconvex lens 121 shown in FIG. 2, the display device 100 may generate the virtual image VI under reduced aberration.

In FIGS. 2 and 3, a single lens is shown as the optical condenser 120. Alternatively, the optical condenser 120 may be formed by using a few lens elements. If a few lenses are used as the optical condenser 120, the optical condenser 120 may be designed so that aberration may be appropriately reduced.

The optical condenser 120 may include a diffracting element configured to diffract the laser beam LB. In this case, a very thin lens may be used as the optical condenser 120. Accordingly, the display device 100 is reduced in size and/or weight.

As described above, the spatial light modulator 130 includes the display surface 131. The illumination light IB generated by the optical condenser 120 enters the display surface 131. The CGH on the display surface 131 diffracts the illumination light IB to generate the diffracted light DFL. In this embodiment, a reflective liquid crystal panel (a phase modulation type) may be used as the spatial light modulator 130. Alternatively, MEMS (Micro Electro Mechanical Systems) may be used as the spatial light modulator 130. The MEMS including a micro mirror formed as a phase modulator may achieve a smaller pixel pitch than a pixel pitch of the aforementioned liquid crystal panel. In that case, the display device 100 may generate the virtual image VI under a large angle of view.

As shown in FIG. 1, the diffracted light DFL passes through the optical condenser 120. Therefore, the diffracted light DFL is subjected to condensing action of the optical condenser 120. Light of the virtual image VI which enters into the pupil of an observer has to be collimated light or divergent light in order to make the observer appropriately observe the virtual image VI. In this embodiment, the pattern generator 143 generates a diffraction pattern so that the diffracted light DFL passing through the optical condenser 120 becomes collimated light or divergent light. Accordingly, a CGH created on the basis of the diffraction pattern which is generated by the pattern generator 143 has lens action for emitting the diffracted light DFL from the optical condenser 120 as collimated or divergent light. As a result of the lens action of the CGH, the observer may appropriately observe the virtual image VI.

Since diffracted light emitted from the CGH is condensed by the optical condenser, the diffracted light becomes convergent light without the lens action. Accordingly, the observer may not appropriately observe an image. In this embodiment, the pattern generator 143 generates a diffraction pattern so that the diffracted light DFL passing through the optical condenser 120 becomes collimated or divergent light. Therefore, as a result of the lens action of the CGH, the observer may appropriately observe the virtual image VI represented by the diffracted light DFL passing through the optical condenser 120. In short, the principle of this embodiment enables design of a short distance "L" between the optical condenser 120 and the spatial light modulator 130.

As shown by the aforementioned formula, if the distance "L" decreases, the diameter "W" of the optical condenser 120 is approximated to the diameter "D" of the spatial light modulator 130. Therefore, the display device 100 may use a small optical system to appropriately display an image.

As described above, the first driver 141 outputs the first driving signals for driving the light source 110 whereas the second driver 142 outputs the second driving signals for driving the spatial light modulator 130. The output of the first driving signals is associated with the output of the second driving signals.

The light source 110 emits the laser beam LB or stops the emission of the laser beam LB in response to the first driving signals. Accordingly, intensity of the laser beam LB is adjusted so that the eyeball of the observer receives an appropriate light amount.

If the light source 110 is driven in a time division manner to emit the red, green and blue laser beams, the second driver 142 may display CGHs of diffraction patterns on the display surface 131 in correspondence to the laser beams in synchronization with the emission of the laser beams. Accordingly, the observer may observe the virtual image VI with a plurality of hues. In this case, the liquid crystal panel used as the spatial light modulator 130 does not require color filters. Therefore, the spatial light modulator 130 may be small.

In this embodiment, the driving portion 140 drives the light source 110 and the spatial light modulator 130. The driving portion 140 may control and/or drive other optical elements. For example, the driving portion 140 may optionally control and/or drive other optical elements for generating the illumination light IB and a reflection mirror configured to reflect light in the display device 100.

Figure 4:
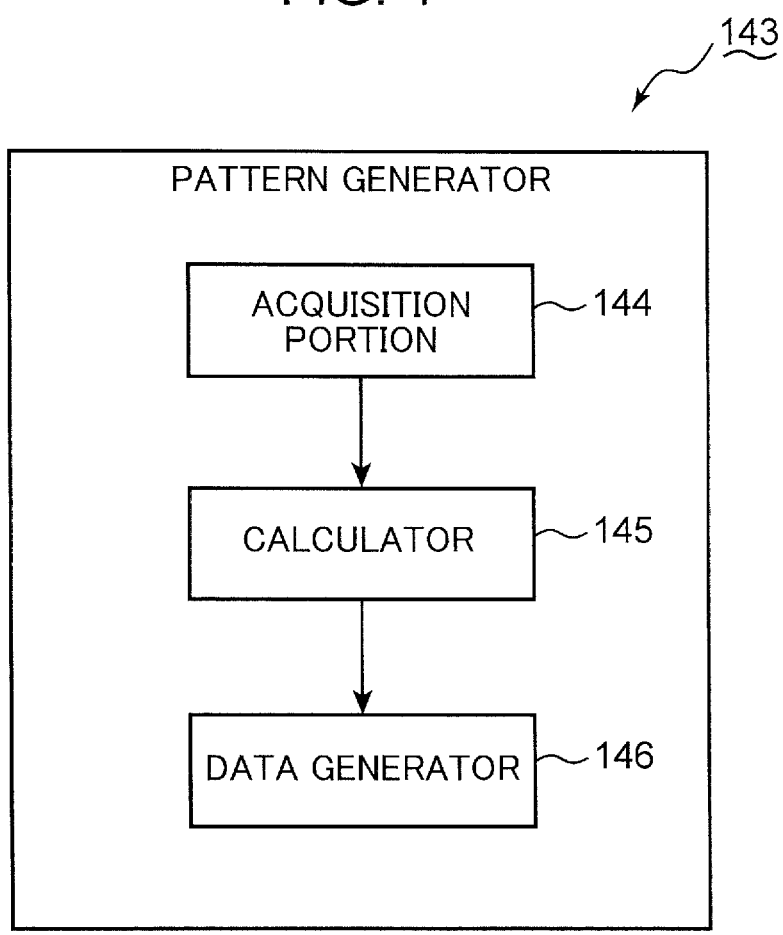
FIG. 4 is an exemplary block diagram of a pattern generator of the display device shown in FIG. 1.

FIG. 4 is an exemplary block diagram of the pattern generator 143. The pattern generator 143 is described with reference to FIGS. 1 and 4.

The pattern generator 143 includes an acquisition portion 144, a calculator 145 and a data generator 146. The acquisition portion 144 acquires image data representing an image. The image data is output from the acquisition portion 144 to the calculator 145. The calculator 145 executes a calculation for a diffraction pattern from the image data. A result of the calculation for a diffraction pattern is output from the calculator 145 to the data generator 146. The data generator 146 generates pattern data representing a diffraction pattern on the basis of the calculation result of the diffraction pattern. The pattern data is output from the data generator 146 to the second driver 142. The second driver 142 generates second driving signals in response to pattern data. The second driving signals are output from the second driver 142 to the spatial light modulator 130. The spatial light modulator 130 displays a CGH on the display surface 131 in response to the second driving signals.

The acquisition portion 144 may be a communication device configured to communicate with an external device (not shown). In this case, the acquisition portion 144 may acquire image data from the external device via the Internet. Alternatively, the acquisition portion 144 may be a storage medium which stores image data in advance. In this case, the image data is generated under power consumption smaller than power consumption in techniques for acquiring an image using communication with an external device. Further alternatively, the acquisition portion 144 may be a program for generating an image from predeteiniined information. The principle of this embodiment is not limited by the acquisition portion 144 at all.

A file format of the image data output by the acquisition portion 144 may be an image file, a text file or a combination of the image file and the text file. For example, the acquisition portion 144 may generate image data of a Bitmap format from predetermined information. The principle of this embodiment is not limited by the image data at all.

The calculator 145 applies a phase addition process to the image data output from the acquisition portion 144. Pixels in the image data have pixel values as real number values. The calculator 145 generates phase values, which are set in a range of "0" to "$2\pi$", for the pixels at random. The generated phase values are added to the pixel values of the pixels in correspondence to the phase values. Accordingly, the image data is converted into complex numbers. It should be noted that the generated phase values are generated as complex numbers having magnitude of "1".

The phase values do not have to be generated at random. The calculator 145 may apply phase values different by "$\frac{1}{2}\pi$" to a pair of pixels adjacent to each other. Accordingly, there may be reduced speckle noise of the laser beam LB, which may potentially occur between the adjacent pixels.

The calculator 145 calculates a diffraction pattern from the image data after the phase addition process. For example, the calculator 145 may apply inverse Fourier transform to the image data to calculate a diffraction pattern. The calculation of a diffraction pattern based on the inverse Fourier transform utilizes an approximation formula of calculations on the basis of the aforementioned point filling method. If the inverse Fourier transform is used for the calculation of a diffraction pattern, a smaller calculation amount is required than a calculation amount in the point filling method is. Therefore, it takes shorter than the point filling method to obtain the diffraction pattern.

A calculation method for a diffraction pattern may depend on calculation techniques other than the inverse Fourier transform. For example, the calculator 145 may execute a calculation on the basis of the point filling method. In this case, the calculator 145 may set a different three-dimensional coordinate for each of pixels. Therefore, the calculator 145 may calculate a diffraction pattern for performing very accurate stereoscopic display.

The calculator 145 may further apply an aberration correction process to the diffraction pattern. As shown in FIG. 1, the diffracted light DFL generated by the spatial light modulator 130 passes through the optical condenser 120. Accordingly, the diffracted light DFL may be affected by aberration of the optical condenser 120. If the calculator 145 executes the aberration correction process, the aberration may become less influential. Therefore, the virtual image VI observed by the observer may maintain high quality.

The calculator 145 may superimpose a phase pattern for correcting aberration on the diffraction pattern. The calculator 145 may have in advance the phase pattern for correcting aberration. The phase pattern for correcting aberration may have the same number of pixels as the number of pixels of the diffraction pattern. Values of the pixels of the phase pattern for correcting aberration are complex numbers representing phases. The calculator 145 superimposes the values of the pixels of the phase pattern with values of pixels of the diffraction pattern for each of the pixels to correct the diffraction pattern.

The principle of this embodiment is not limited by generation techniques for a phase pattern for correcting aberration at all. The calculator 145 may use other operation techniques to reduce aberration. For example, an amount of the aberration may be calculated in advance by an optical simulator such as ZEMAX. The calculator 145 may determine phase values for correcting calculated aberration.

The calculator 145 may have in advance the phase pattern for correcting aberration or may calculate the phase pattern for correcting aberration if necessary. If the calculator 145 calculates the phase pattern as appropriate, the pattern generator 143 does not have to include a storage device for storing the phase pattern. Therefore, the driving portion 140 may be inexpensively manufactured.

The phase pattern may be used for not only correcting the aberration of the optical condenser 120 but also correcting the vision of the observer. Additionally or alternatively, the phase pattern may be used for changing a display position of the virtual image VI.

The data generator 146 applies a quantization process to the diffraction pattern calculated by the calculator 145 to generate pattern data.

If the spatial light modulator 130 can display a binary phase of "0" or "$\pi$", the data generator 146 determines whether the values of the phases of the pixels of the diffraction pattern calculated by the calculator 145 are close to "0". If the values of the phases of the pixels of the diffraction pattern calculated by the calculator 145 are close to "0", the data generator 146 allocates the value "0" to the corresponding pixels. If the values of the phases of the pixels of the diffraction pattern calculated by the calculator 145 are close to "π", the data generator 146 allocates the value "π" to the corresponding pixels.

The quantization process may depend on display characteristics of the spatial light modulator 130. Therefore, the data generator 146 may execute a quantization process exceeding binarization. In this case, there may be reduced resultant noise from the quantization process.

After the quantization process, the data generator 146 outputs the pattern data. The second driver 142 generates second driving signals in response to the pattern data. The spatial light modulator 130 displays a CGH on the display surface 131 in response to the second driving signals.

If a liquid crystal panel is used as the spatial light modulator 130, liquid crystal of the liquid crystal panel operates in response to the second driving signals to achieve phase values set by the pattern data. Accordingly, a modulation amount in the liquid crystal panel is appropriately set. When the light source 110 controlled by the first driving signals from the first driver 141 emits the laser beam LB, the diffracted light DFL is generated by the CGH on the display surface 131 of the spatial light modulator 130. Therefore, the observer may observe the virtual image VI.

Figure 5:
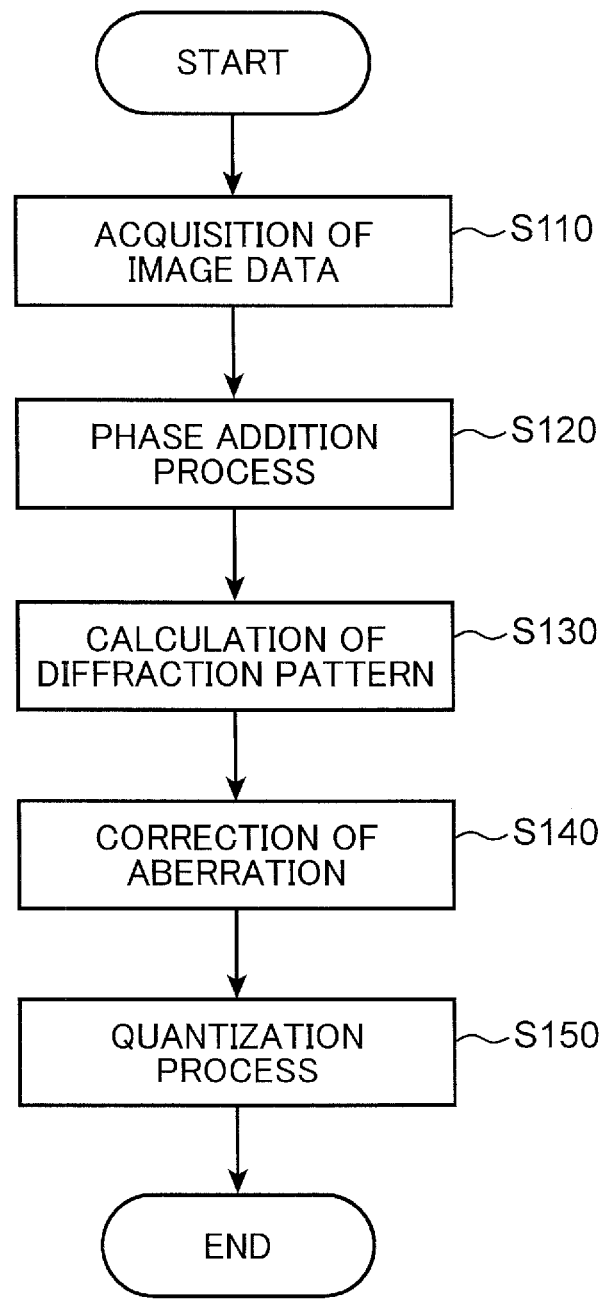
FIG. 5 is a flowchart showing an exemplary operation of the pattern generator shown in FIG. 4.

FIG. 5 is a flowchart showing an exemplary operation of the pattern generator 143. The pattern generator 143 is further described with reference to FIGS. 1, 4 and 5.

(Step S110)

In step S110, the acquisition portion 144 acquires image data. As described above, the acquisition portion 144 may acquire the image data through the Internet. Alternatively, the image data may be stored in the acquisition portion 144 in advance. The image data is output from the acquisition portion 144 to the calculator 145. Thereafter, step S120 is executed.

(Step S120)

In step S120, the calculator 145 executes the aforementioned phase addition process. Accordingly, the image data is converted into complex numbers. Thereafter, step S130 is executed.

(Step S130)

In step S130, the calculator 145 calculates a diffraction pattern from the image data by using the inverse Fourier transform or the point filling method as described above. In this case, the calculator 145 calculates the diffraction pattern so that the diffracted light DFL emitted from the spatial light modulator 130 through the optical condenser 120 becomes collimated or divergent light. Therefore, there may be the virtual image VI which the observer can perceive even if the diffracted light DFL passes through the optical condenser 120.

The spatial light modulator 130 may generate several kinds of light different in orders as the diffracted light DFL. The calculator 145 may calculate a diffraction pattern so that a part of the diffracted light DFL generated by the spatial light modulator 130 becomes collimated or divergent light.

A CGH displayed on the display surface 131 of the spatial light modulator 130 on the basis of the diffraction pattern does not have to convert all the illumination light IB into the diffracted light DFL. In this case, light emitted from the spatial light modulator 130 includes the diffracted light DFL and non-diffracted light (a component of light which is not converted into the diffracted light DFL by the spatial light modulator 130). Since the illumination light IB passes through the optical condenser 120, the illumination light 1B becomes convergent light. Therefore, the non-diffracted light also becomes convergent light. Accordingly, the observer is less likely to perceive a noise image which is caused by the non-diffracted light.

After the calculation for the diffraction pattern, step S140 is executed.

(Step S140)

In step S140, the calculator 145 uses the correction pattern for correcting aberration as described above to correct the diffraction pattern. The calculator outputs the corrected diffraction pattern to the data generator 146 as a calculation result. Thereafter, step S150 is executed.

(Step S150)

In step S150, the data generator 146 applies the quantization process to the diffraction pattern as described above. Accordingly, the second driver 142 may generate second driving signals for driving the spatial light modulator 130.

FIG. 6 is a schematic view showing an exemplary relationship between an image represented by image data and a diffraction pattern. The operation of the pattern generator 143 is further described with reference to FIGS. 1, 4 to 6.

In step S110, the acquisition portion 144 acquires image data. FIG. 6 schematically shows a region of an image represented by the image data. The region of the image represented by the image data includes a left image region and a right image region on the right of the left image region. FIG. 6 shows a boundary line BL between the left and right image regions. In this embodiment, one of the left and right image regions is exemplified as the first region. The other of the left and right image regions is exemplified as the second region.

In step S130, the calculator 145 calculates a diffraction pattern. The diffraction pattern shown in FIG. 6 includes a left diffraction pattern in correspondence to the left image region and a right diffraction pattern in correspondence to the right image region. In this case, the calculator 145 may provide a difference in intensity of lens action between the left and right diffraction patterns. The right diffraction pattern shown in FIG. 6 has the lens action more intense than the left diffraction pattern does. In this embodiment, one of the left and right diffraction patterns is exemplified as the first diffraction pattern. The other of the left and right diffraction patterns is exemplified as the second diffraction pattern. The lens action different between the left and right diffraction patterns is exemplified as the optical action different between the first and second diffraction patterns.

The calculator 145 may give different lens action to each of the regions of the image according to various factors such as characteristics of the image represented by the image data and optical performance characteristics of the display device 100. Therefore, the region division shown in FIG. 6 does not limit the principle of this embodiment at all.

Figure 7:
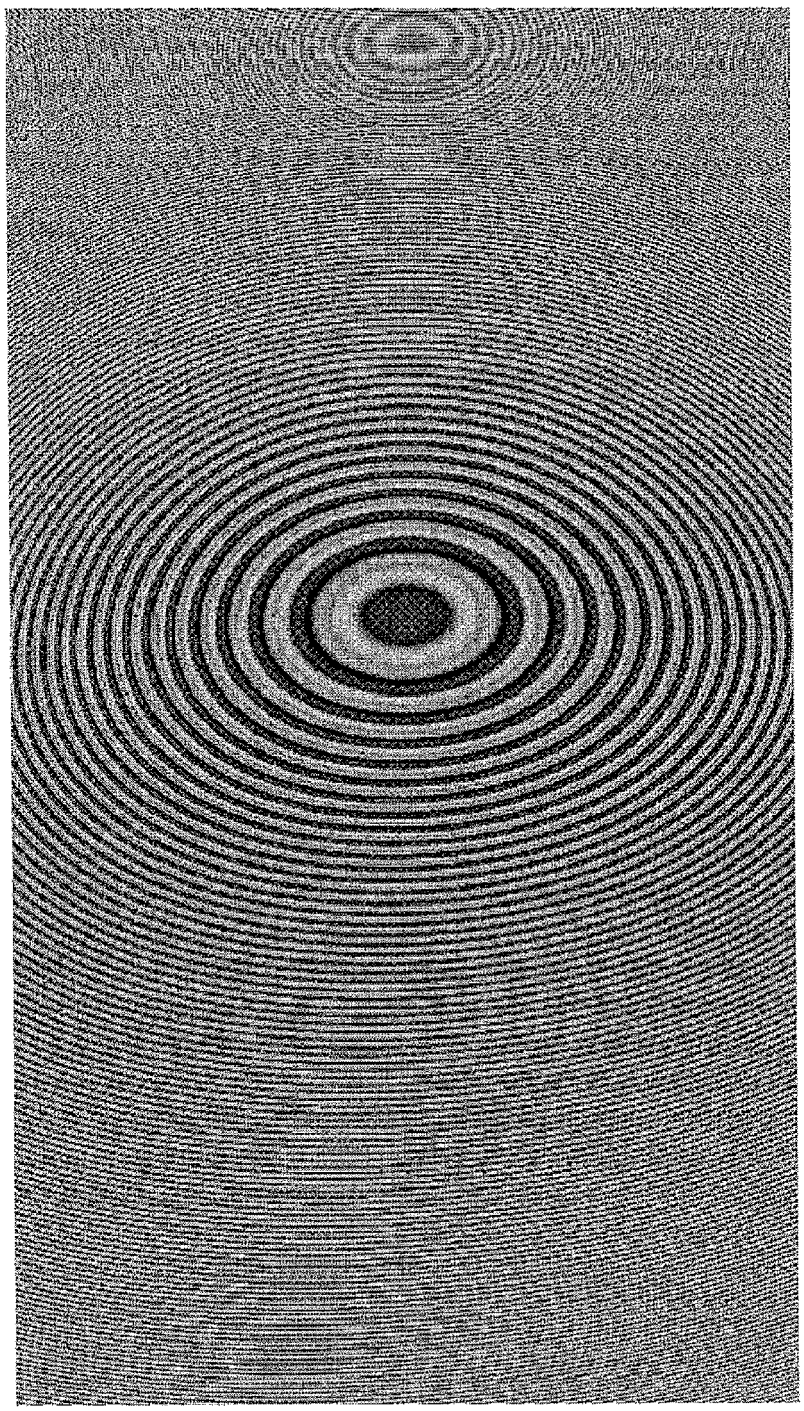
FIG. 7 is an exemplary phase pattern used by the pattern generator shown in FIG. 4.

FIG. 7 is an exemplary phase pattern used in step S140. The operation of the pattern generator 143 is further described with reference to FIGS. 1, 4, 5 and 7.

In step S140, the calculator 145 uses a phase pattern to correct the diffraction pattern calculated in step S130. The phase pattern may be set on the basis of a positional relationship between the light source 110 and the spatial light modulator 130 and other optical characteristics. Therefore, the phase pattern shown in FIG. 7 does not limit the principle of this embodiment at all.

<Second Embodiment>

In addition to the various components described in the context of the first embodiment, a display device may include other optical elements. A display device additionally including an optical element for increasing a spread angle of a laser beam emitted from a light source is described in the second embodiment.

Figure 8:
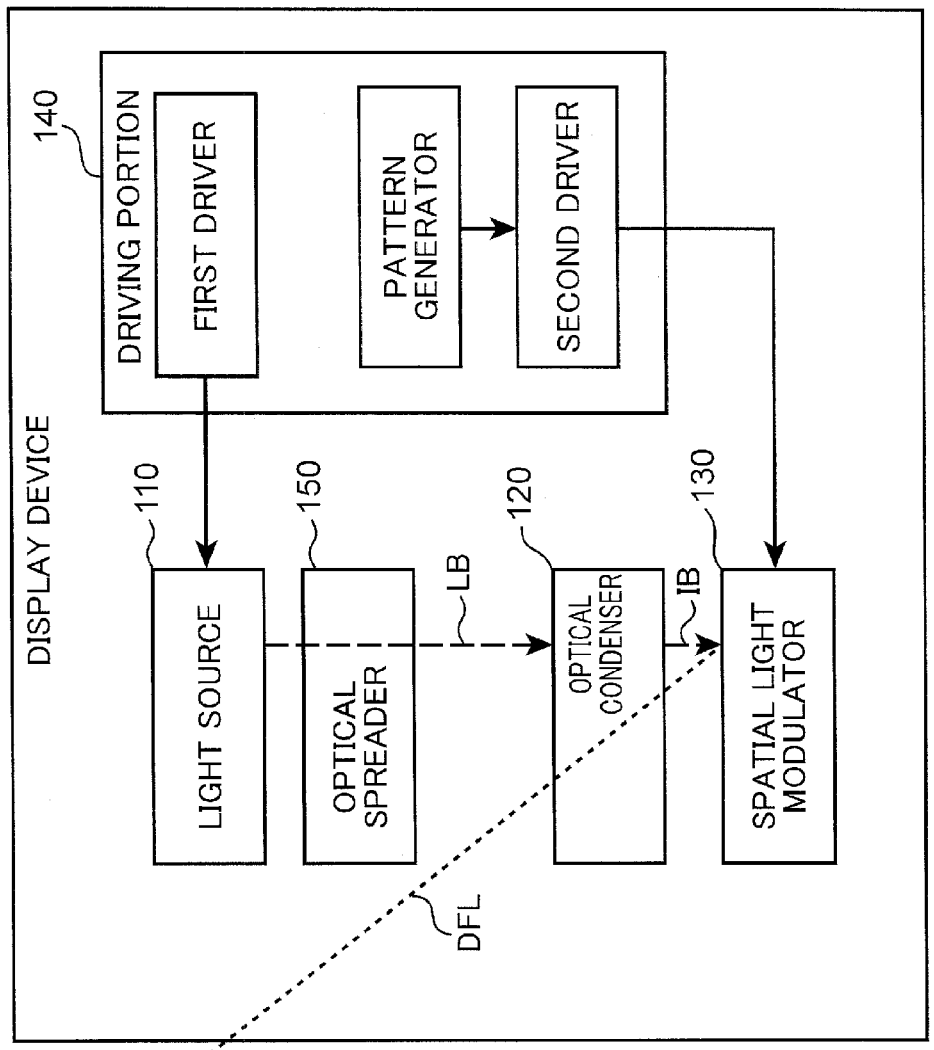
FIG. 8 is a schematic block diagram of a display device according to the second embodiment.

FIG. 8 is a schematic block diagram of the display device 100A in the second embodiment. The display device 100A is described with reference to FIG. 8. Reference numerals used in common between the first and second embodiments mean that components denoted by the common reference numerals have the same functions as the first embodiment. Therefore, the description in the first embodiment is applied to these components.

Like the first embodiment, the display device 100A includes the light source 110, the optical condenser 120, the spatial light modulator 130 and the driving portion 140. The display device 100A further includes an optical spreader 150.

The optical spreader 150 increases a spread angle of the laser beam LB between the light source 110 and the optical condenser 120. The optical spreader 150 may be a single concave lens. Alternatively, the optical spreader 150 may be formed from a plurality of lens elements. In this case, resultant aberration from the lens elements becomes smaller than resultant aberration from the single concave lens.

<Third Embodiment>

A spatial light modulator for displaying a CGH may be transmissive. A display device including the transmissive spatial light modulator is described in the third embodiment.

Figure 9:
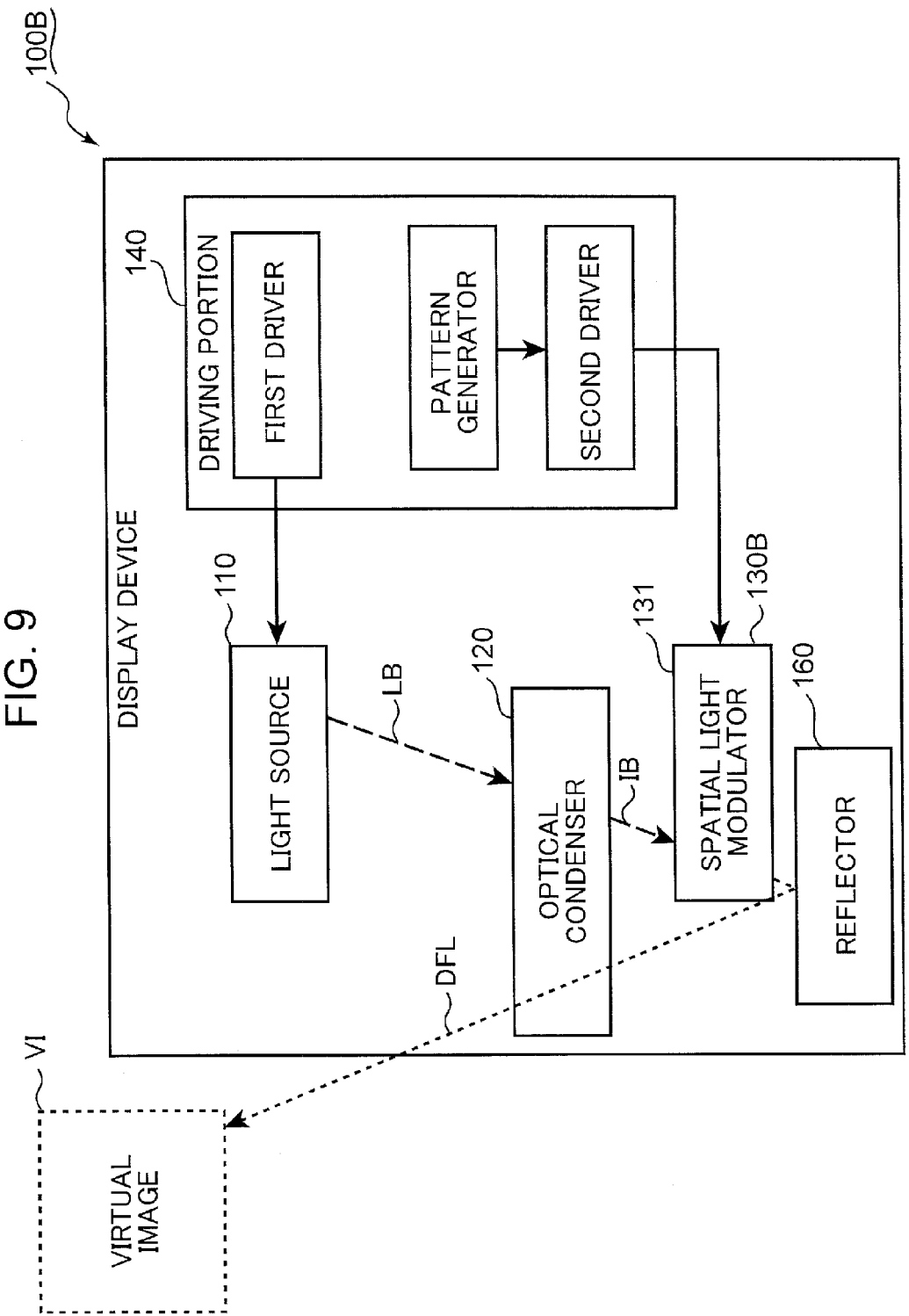
FIG. 9 is a schematic block diagram of a display device according to the third embodiment.

FIG. 9 is a schematic block diagram of the display device 100B according to the third embodiment. The display device 100B is described with reference to FIG. 9. Reference numerals used in common between the first and third embodiments mean that components denoted by the common reference numerals have the same functions as the first embodiment. Therefore, the description in the first embodiment is applied to these components.

Like the first embodiment, the display device 100B includes the light source 110, the optical condenser 120 and the driving portion 140. The display device 100B further includes a spatial light modulator 130B and a reflector 160. The transmissive liquid crystal panel is exemplified by the spatial light modulator 130B. A general reflection mirror may be used as the reflector 160.

Like the first embodiment, the light source 110 emits the laser beam LB. While the laser beam LB passes through the optical condenser 120, the optical condenser 120 changes the laser beam LB into the illumination light IB. The spatial light modulator 130B includes the display surface 131 illuminated by the illumination light IB. The spatial light modulator 130B is driven by the driving portion 140 to display a CGH on the display surface 131. The CGH on the display surface 131 diffracts the illumination light IB to generate the diffracted light DFL.

Unlike the first embodiment, the spatial light modulator 130B allows passage of the diffracted light DFL. The reflector 160 reflects the diffracted light DFL. Accordingly, the diffracted light DFL is emitted from the display device 100B through the optical condenser 120. Like the first embodiment, the CGH on the display surface 131 is formed so that the diffracted light DFL emitted from the optical condenser 120 changes to collimated or divergent light. Therefore, an observer may appropriately observe the virtual image VI represented by the diffracted light DFL.

<Fourth Embodiment>

The spatial light modulator in the first embodiment is used as a reflecting element having a function of reflecting light. The reflector in the third embodiment is used as the reflecting element. These reflecting functions are not always necessary. A display device configured to display a virtual image without reflecting light is described in the third embodiment.

Figure 10:
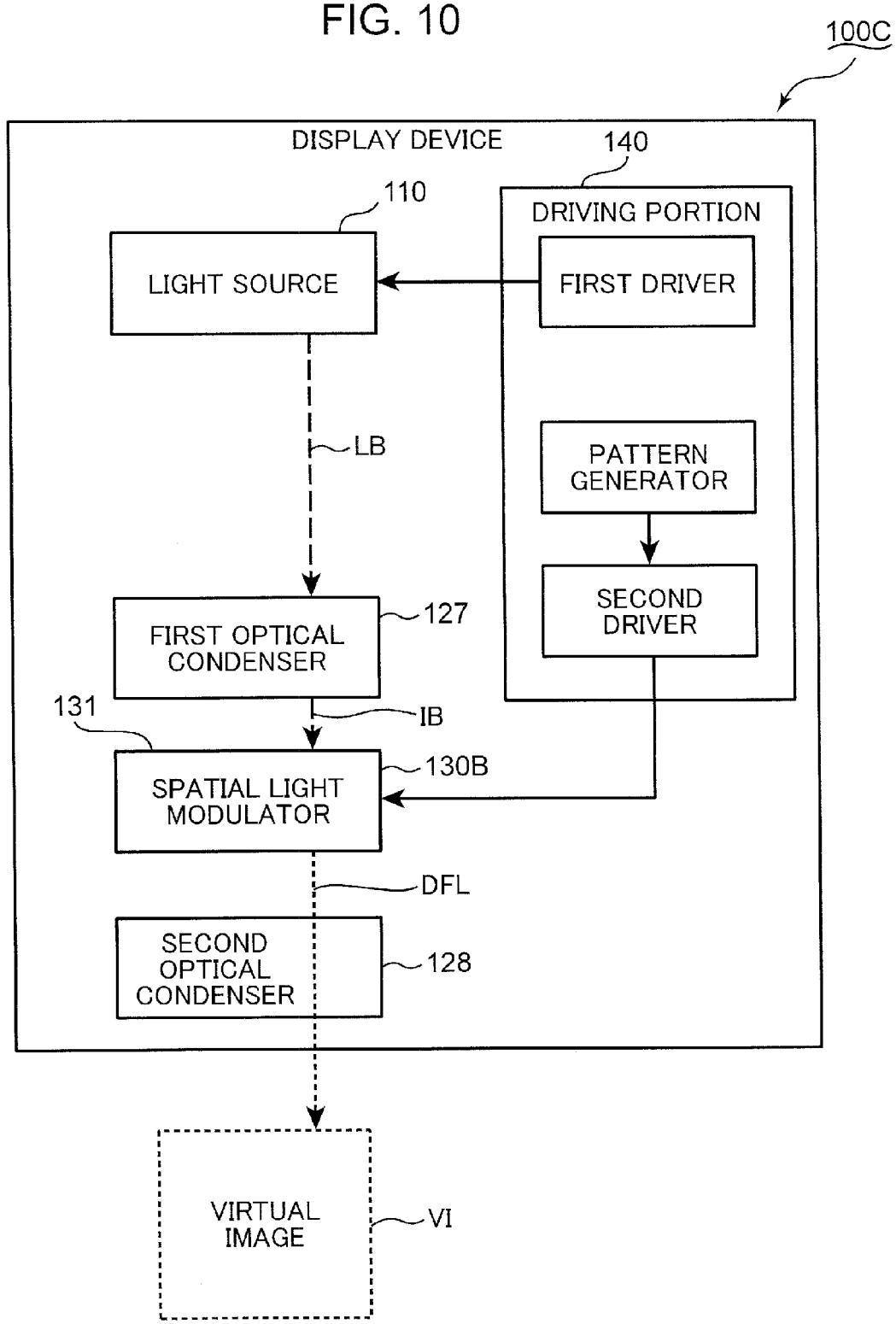
FIG. 10 is a schematic block diagram of a display device according to the fourth embodiment.

FIG. 10 is a schematic block diagram of the display device 100C according to the fourth embodiment. The display device 100C is described with reference to FIG. 10. Reference numerals used in common between the first or third embodiment and the fourth embodiment mean that components denoted by the common reference numerals have the same functions as the first or third embodiment. Therefore, the description in the first or third embodiment is applied to these components.

Like the first embodiment, the display device 100C includes the light source 110 and the driving portion 140. Like the third embodiment, the display device 100C includes the spatial light modulator 130B. The display device 100C further includes a first optical condenser 127 and a second optical condenser 128. The first optical condenser 127 is situated between the light source 110 and the spatial light modulator 130B. The spatial light modulator 130B is situated between the first and second optical condensers 127, 128. In this embodiment, the first and second optical condensers 127, 128 are exemplified as the optical condensers.

Like the first embodiment, the light source 110 emits the laser beam LB. The first optical condenser 127 condenses the laser beam LB toward the spatial light modulator 130B to generate the illumination light IB. Like the third embodiment, the illumination light IB enters into the display surface 131, on which a CGH is displayed, and is changed into the diffracted light DFL. The diffracted light DFL is then emitted from the display device 100C through the second optical condenser 128.

The second optical condenser 128 exhibits condensing action for light emitted from the spatial light modulator 130B. However, the CGH on the display surface 131 is formed so that the diffracted light DFL emitted from the second optical condenser 128 is changed into collimated or divergent light. Therefore, an observer may appropriately observe the virtual image VI represented by the diffracted light DFL. On the other hand, a light component which fails to be diffracted by the spatial light modulator 130B is less likely to be perceived as a noise image on the virtual image VI by the observer under the condensing action of the second optical condenser 128.

<Fifth Embodiment>

The various principles of the embodiments are suitably applied to a wearable display device. An HMD is exemplified as the wearable display device. An HMD developed on the basis of the principle of the first embodiment is described in the fifth embodiment.

Figure 11:
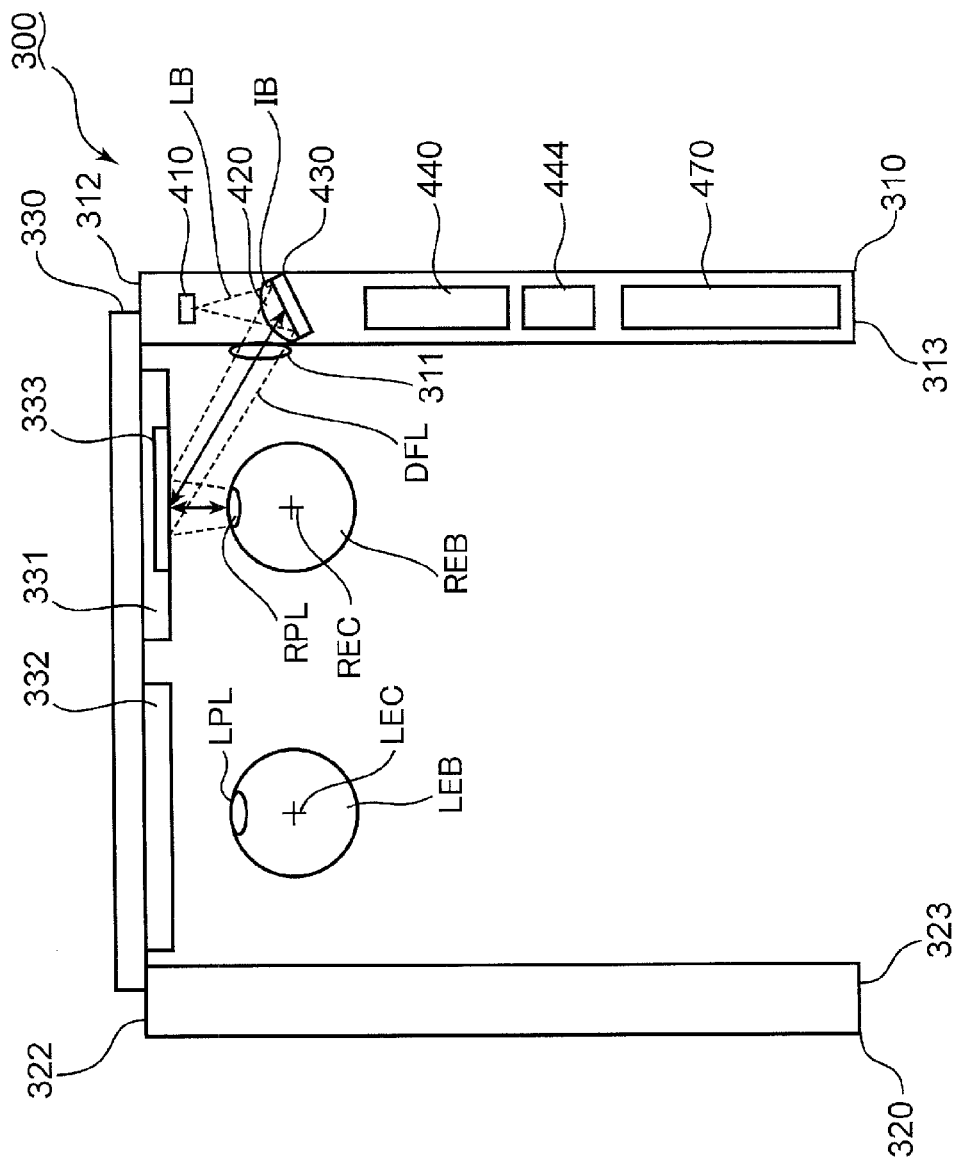
FIG. 11 is a schematic view of an HMD according to the fifth embodiment.

FIG. 11 is a schematic view of the HMD 300 according to the fifth embodiment. The HMD 300 is described with reference to FIGS. 1, 4 and 11. The HMD 300 is exemplified as the display device.

The HMD 300 geometrically looks like general eyeglasses for visual correction. The HMD 300 includes a right arm 310, a left arm 320 and a screen 330. The right arm 310 is hooked on the right ear of an observer. The left arm 320 is hooked on the left ear of the observer. The screen 330 is situated between the right and left arms 310, 320.

The various components described with reference to FIG. 1 are stored in the right arm 310. Therefore, the right arm 310 functions as a housing. The right arm 310 includes an emission window 311. The diffracted light DFL generated in the right arm 310 is emitted from the emission window 311 toward the screen 330.

The HMD 300 further includes a laser source 410, a condensing lens 420, a liquid crystal panel 430 (a reflective type) and a control circuit 440. The laser source 410 emits the laser beam LB. The laser source 410 corresponds to the light source 110 described in the context of the first embodiment. The condensing lens 420 condenses the laser beam LB to generate the illumination light IB. The condensing lens 420 corresponds to the optical condenser 120 described in the context of the first embodiment. The liquid crystal panel 430 uses a CGH to diffract the illumination light IB and generate the diffracted light DFL. The liquid crystal panel 430 corresponds to the spatial light modulator 130 described in the context of the first embodiment. The control circuit 440 controls the laser source 410 and the liquid crystal panel 430. The laser source 410 emits the laser beam LB under control of the control circuit 440. The liquid crystal panel 430 displays the CGH under control of the control circuit 440. The control circuit 440 corresponds to the driving portion 140 described in the context of the first embodiment.

Unlike the first embodiment, the liquid crystal panel 430 is inclined from the optical path defined between the laser source 410 and the liquid crystal panel 430. Therefore, a diffraction angle required for the liquid crystal panel 430 is smaller than the first embodiment. In short, the observer may observe an image in a wide angle of view even under a small diffraction angle resultant from the liquid crystal panel 430.

The HMD 300 further has a communicator 444. The communicator 444 is used for communicating information with an external device (not shown). For example, the communicator 444 may be configured to make wireless communication with a server on the Internet. Alternatively, the communicator 444 may be configured to a communication network used by a mobile terminal such as a cellular phone. Further alternatively, the communicator 444 may be used for connection to a device in a short distance (e.g. Wi-Fi). Further alternatively, the communicator 444 may be connected by wire to a terminal device including a wireless communication function and/or an Internet connection function. The principle of this embodiment is not limited by communication techniques between the communicator 444 and the external device at all.

If the communicator 444 acquires image data from the external device, the communicator 444 corresponds to the acquisition portion 144 described in the context of the first embodiment. In this case, the communicator 444 outputs the image data to the control circuit 440. The control circuit 440 calculates a diffraction pattern according to the image data. The liquid crystal panel 430 displays a CGH according to the diffraction pattern.

The HMD 300 further includes a battery 470. The battery 470 supplies electric power to the laser source 410, the liquid crystal panel 430, the control circuit 440 and the communicator 444. The battery 470 may be chargeable. In this case, the battery 470 may be charged while the HMD 300 is not used. Alternatively, the battery 470 does not have to be chargeable.

The right arm 310 includes a proximal end 312 connected to the screen 330 and a distal end 313 opposite to the proximal end 312. The laser source 410, the condensing lens 420, the liquid crystal panel 430, the control circuit 440, the communicator 444 and the battery 470 are aligned sequentially from the proximal end 312 to the distal end 313. In this case, the battery 470 may be heavier than the laser source 410, the condensing lens 420, the liquid crystal panel 430, the control circuit 440 and the communicator 444. The weight of the battery 470 contributes to holding the screen 330 in front of the eyes.

In this embodiment, the HMD 300 includes the battery 470. However, the battery 470 does not limit the principle of this embodiment at all. The HMD may receive electric power from an external power supply (not shown) through a cord. Alternatively, the HMD may include a component capable of generating power. Power supply for driving the HMD may be various known techniques.

The left arm 320 includes a proximal end 322 connected to the screen 330 and a distal end 323 opposite to the proximal end 322. The right and left arms 310, 320 may be bendable from the screen 330 at the proximal ends 312, 322. Alternatively, the right arm 310 may be bendable between the liquid crystal panel 430 and the distal end 313. The left arm 320 may be bendable in a position corresponding to a bending position of the right arm 310. If the right and left arms 310, 320 are bendable, a user may easily carry the HMD 300.

FIG. 11 shows the right eyeball REB and the left eyeball LEB. It should be noted that the right and left eyeballs REB, LEB are drawn in positions assumed in a design of the HMD 300. The right pupil RPL and the rotation center point REC of the right eyeball REB are drawn in the right eyeball REB. The left pupil LPL and the rotation center point LEC of the left eyeball LEB are drawn in the left eyeball LEB. The right pupil RPL and the rotation center point REC are also drawn in positions assumed in the design of the HMD 300. The left pupil LPL and the rotation center point LEC are also drawn in positions assumed in the design of the HMD 300.

An actual positional relationship between the eyeballs or relevant components to the eyeballs and the HMD 300 may be different from a positional relationship between the positions of the eyeballs or the components and the HMD 300 assumed in the design. The HMD 300 may include adjusting functions for cancelling a difference between the actual positional relationship and the positional relationship in the design.

The screen 330 may include a right screen 331 situated in front of the right eyeball REB and a left screen 332 situated in front of the left eyeball LEB. The left screen 332 does not prevent light traveling from a space in front of the screen 330 to the left eyeball LEB. Therefore, the observer may visually recognize a scene of the space in front of the screen 330 with the left eyeball LEB.

The screen 330 further includes a right reflection mirror 333 formed in the right screen 331. The right screen 331 does not prevent light traveling from the space in front of the screen 330 to the right eyeball REB. The right reflection mirror 333 allows transmission of a part of the light traveling from the space in front of the screen 330 to the right eyeballs REB. Therefore, the observer may visually recognize a scene of the space in front of the screen 330 with the right eyeball REB.

The diffracted light DFL emitted from the emission window 311 enters the right reflection mirror 333. The right reflection mirror 333 reflects the diffracted light DFL. Therefore, the diffracted light DFL enters into the right pupil RPL. The diffracted light DFL is then focused on the retina of the right eyeball REB. Therefore, the observer may perceive an image represented by the diffracted light DFL.

A semi-transmissive Fresnel mirror may be used as the right reflection mirror 333. The semi-transmissive Fresnel mirror is formed by deposition of a metal thin film on a Fresnel lens. The semi-transmissive Fresnel mirror may be bonded to the right screen 331 by adhesive. It may be preferable that the adhesive in use has substantially the same refractive index as the semi-transmissive Fresnel mirror. If a difference in the refractive indexes is sufficiently small between the adhesive and the semi-transmissive Fresnel mirror, light traveling from the space in front of the screen 330 to the right eyeball REB may travel straight. Accordingly, the observer may perceive the scene of the space in front of the screen 330 without distortion.

Alternatively, the semi-transmissive Fresnel mirror may include a pair of Fresnel mirrors and a metal thin film deposited between the Fresnel mirrors. In this case, the semi-transmissive Fresnel mirror acts as flat glass for the light traveling from the space in front of the screen 330 to the right eyeball REB. Therefore, the observer may perceive the scene of the space in front of the screen 330 without distortion.

A dielectric multilayer film may be deposited on the Fresnel mirror instead of the metal thin film. The dielectric multilayer film is less likely to absorb light than the metal thin film is. Therefore, transmittance for light traveling from the space in front of the screen 330 to the right eyeball REB is improved.

The right reflection mirror 333 may be embedded in the right screen 331. Since the screen 330 becomes thinner, the HMD 300 looks better.

The right reflection mirror 333 may have a lens shape.

The right reflection mirror 333 may be formed by using a diffraction grating such as a hologram. If the hologram is used as the right reflection mirror 333, high transmittance is achieved. In addition, the screen 330 becomes thinner.

In this embodiment, the HMD 300 includes the right reflection mirror 333. However, the right reflection mirror 333 is not always necessary. The HMD may be designed so that the diffracted light DFL directly enters the right pupil RPL. If the diffracted light DFL enters the right pupil RPL without reflection, there is no resultant reduction in an angle of view from reflection of the diffracted light DFL. Therefore, the observer may observe an image in a wide angle of view.

The left and right screens 332, 331 may exhibit the same action as the lens actions for view correction. In this case, near-sightedness, far-sightedness and astigmatism of the observer are appropriately corrected.

The left and right screens 332, 331 may reduce transmittance of incident light from the space in front of the screen 330. In this case, the HMD 300 may exhibit the same function as sunglasses.

The left and right screens 332, 331 may include thin films having functions of preventing unnecessary reflection and antifouling functions.

Figure 12:
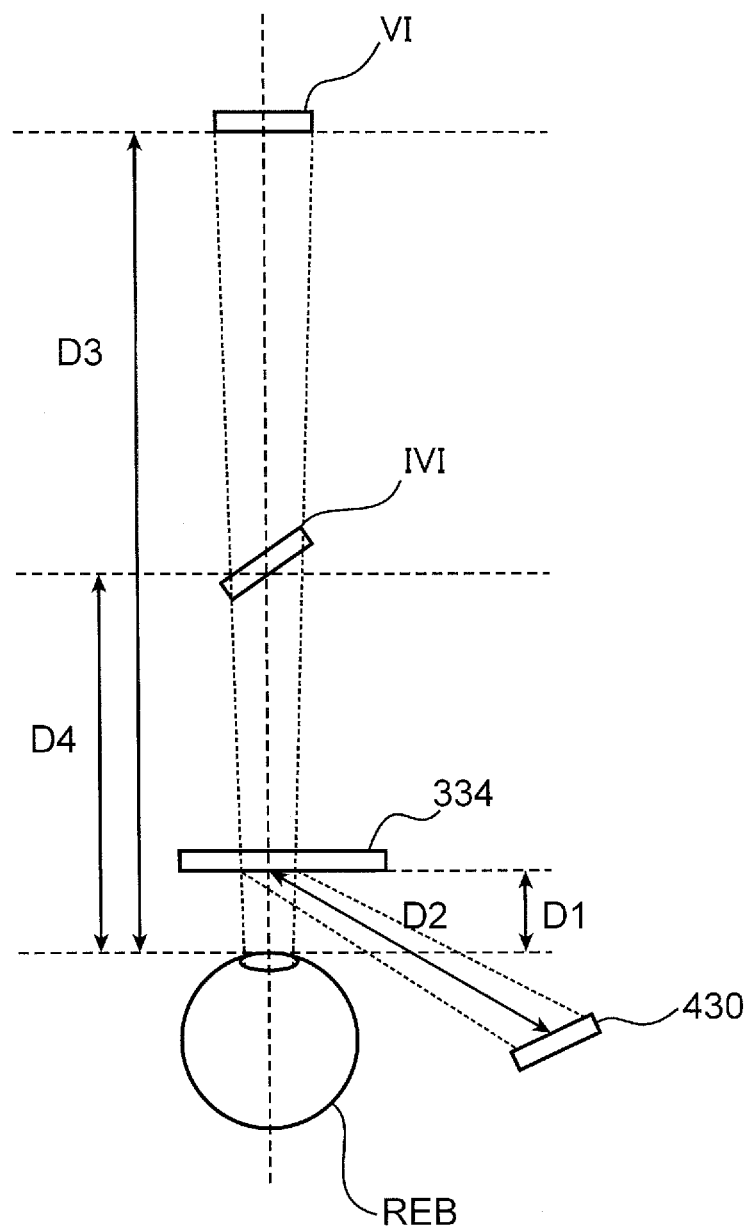
FIG. 12 is a schematic view showing a positional relationship between an observer and a virtual image.

FIG. 12 is a schematic view showing a positional relationship between the observer and the virtual image VI. The positional relationship between the observer and the virtual image VI is described with reference to FIGS. 11 and 12.

FIG. 12 shows the right eyeball REB, the virtual image VI and the liquid crystal panel 430. FIG. 12 further shows the reflection mirror 334. The reflection mirror 334 is used as the right reflection mirror 333 described with reference to FIG. 11. Optical magnification of the reflection mirror 334 is set to "1". In FIG. 12, a distance from the right eyeball REB to the reflection mirror 334 is represented by the symbol "D1". A distance from the liquid crystal panel 430 to the reflection mirror 334 is represented by the symbol "D2". It should be noted that the distance from the liquid crystal panel 430 to the reflection mirror 334 is defined in FIG. 12 as the distance from the center point of the liquid crystal panel 430 to the center point of the reflection mirror 334. Alternatively, the distance from the liquid crystal panel 430 to the reflection mirror 334 may be set by other definitions.

The virtual image VI is drawn in a position away from the right eyeball REB by the distance "D3". The distance "D3" is set by a CGH created on the liquid crystal panel 430.

FIG. 12 shows an inverted image IVI of the liquid crystal panel 430 inverted around the reflection mirror 334. The distance from the right eyeball REB to the inverted image IVI is represented by using the symbol "D4" in FIG. 12. The distance "D4" is equal to a sum of the distance "D1" and the distance "D2".

Figure 13:
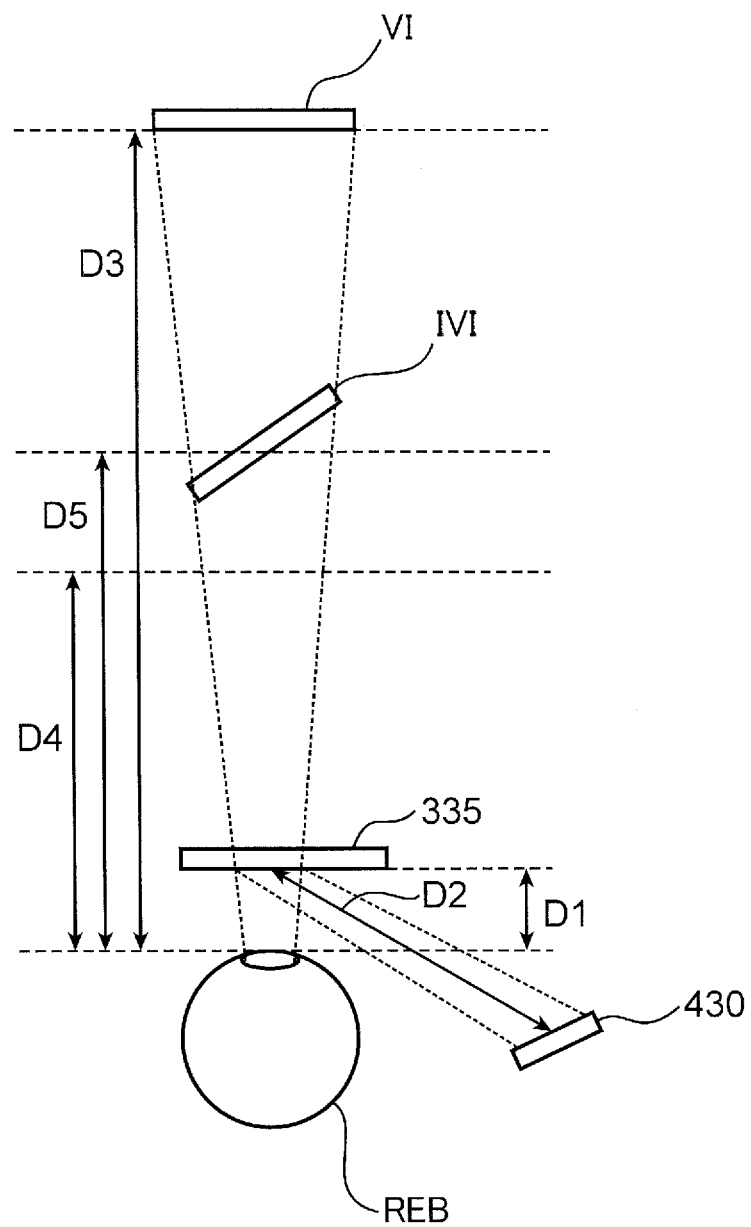
FIG. 13 is another schematic view showing the positional relationship between the observer and the virtual image.

FIG. 13 is a schematic view showing a positional relationship between the observer and the virtual image VI. The positional relationship between the observer and the virtual image VI is described with reference to FIGS. 11 to 13.

Like FIG. 12, FIG. 13 shows the right eyeball REB, the virtual image VI and the liquid crystal panel 430. FIG. 13 further shows a reflection mirror 335. The reflection mirror 335 is used as the right reflection mirror 333 described with reference to FIG. 11. Optical magnification of the reflection mirror 335 is set to magnification "M" larger than "1".

Like FIG. 12, the distance from the right eyeball REB to the reflection mirror 335 is represented by the symbol "D1" in FIG. 13. The distance from the liquid crystal panel 430 to the reflection mirror 335 is represented by the symbol "D2". It should be noted that the distance from the liquid crystal panel 430 to the reflection mirror 335 is defined in FIG. 13 as the distance from the center point of the liquid crystal panel 430 to the center point of the reflection mirror 335, like FIG. 12. Alternatively, the distance from the liquid crystal panel 430 to the reflection mirror 335 may be set by other definitions.

Like FIG. 12, the virtual image VI is drawn in a position away from the right eyeball REB by the distance "D3". The distance "D3" is set by the CGH created on the liquid crystal panel 430.

Like FIG. 12, FIG. 13 shows the inverted image IVI of the liquid crystal panel 430 inverted around the reflection mirror 335. In FIG. 13, the distance from the right eyeball REB to the inverted image IVI is represented by using the symbol "D5". The distance "D5" is longer than the distance "D4" due to the optical magnification of the reflection mirror 335 larger than the optical magnification of the reflection mirror 334. Therefore, if the reflection mirror 335 having the large magnification is used as the right reflection mirror 333, the observer may observe a large virtual image VI.

As described above, the distance "D3" depends on the CGH on the liquid crystal panel 430. Therefore, the CGH may be set to be suitable for the vision of the observer.

In this embodiment, the various functions of the HMD 300 are described. A part of these functions may be provided for a device (e.g. a mobile terminal or a network server) other than the HMD.

In this embodiment, the control circuit 440 may calculate a diffraction pattern. Alternatively, an external device (not shown) may calculate the diffraction pattern. In this case, the communicator 444 may receive a calculation result of the diffraction pattern calculated by the external device. Further alternatively, the external device may execute a part of the calculation for the diffraction pattern. In this case, the control circuit 440 may use the calculation result output from the communicator 444 to execute the remaining calculation for acquiring the diffraction pattern.

If the external device performs at least a part of the calculation of the circuit pattern, a calculation capacity required of the HMD 300 may be low. Accordingly, the HMD 300 is inexpensively manufactured. In addition, power consumption of the HMD 300 decreases.

In this embodiment, the laser source 410 is situated in the right arm 310. Alternatively, a light source may be situated outside the HMD. In this case, the light source may be connected to the HMD by an optical fiber. If the light source is situated outside the HMD, heat from the light source is less likely to cause inconvenience in use, mechanical failures and electrical failures.

In this embodiment, the battery 470 is situated in the right arm 310. A power supply having a large power storage capacity is generally large in size. Therefore, it is preferable that the power supply is situated outside the HMD if an HMD requires the power supply having a large power storage capacity. Since the large power supply is situated outside the HMD, the power supply does not prevent the user from wearing the HMD.

The HMD may have functions other than the display function. For example, the HMD may have functions of a speaker and a camera. The HMD may include various sensors for detecting an angular velocity and a temperature. The HMD may have a function as a GPS. The HMD may include an input device such as a switching device for manually switching ON/OFF of power supply.

<Sixth Embodiment>

The principle of the fifth embodiment makes it possible to observe a virtual image with one eye. An HMD which makes it possible to observe a virtual image with both eyes is described in the sixth embodiment.

Figure 14:
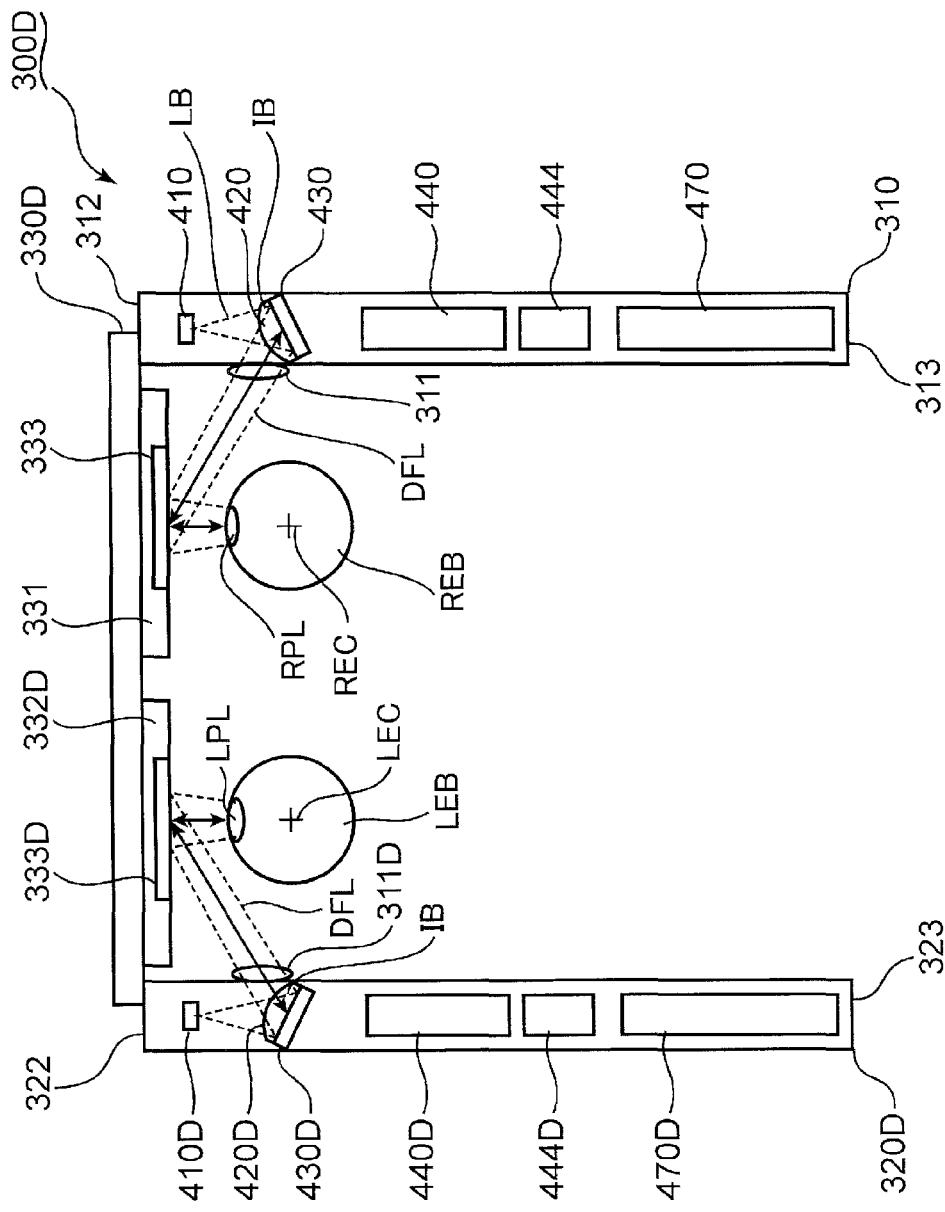
FIG. 14 is a schematic view of an HMD according to the sixth embodiment.

FIG. 14 is a schematic view of the HMD 300D in the sixth embodiment. The HMD 300D is described with reference to FIGS. 1 and 14. The HMD 300D is exemplified as the display device. Reference numerals used in common between the fifth and sixth embodiments mean that components denoted by the common reference numerals have the same functions as the fifth embodiment. Therefore, the description in the fifth embodiment is applied to these components.

Like the fifth embodiment, the HMD 300D includes the right arm 310, the laser source 410, the condensing lens 420, the liquid crystal panel 430 (a reflective type), the control circuit 440, the communicator 444 and the battery 470. The HMD 300D further includes a screen 330D and a left arm 320D. The left arm 320D is hooked on the left ear of an observer. The screen 330D is situated between the right and left arms 310, 320D.

The HMD 300D further includes a laser source 410D, a condensing lens 420D, a liquid crystal panel 430D (a reflective type), a control circuit 440D, a communicator 444D and a battery 470D. The laser source 410D, the condensing lens 420D, the liquid crystal panel 430D, the control circuit 440D, the communicator 444D and the battery 470D are stored in the left arm 320D. Therefore, the left arm 320D functions as a housing. The left arm 320D includes an emission window 311D. The diffracted light DFL generated in the left arm 320D is emitted from the emission window 311D toward the screen 330D.

Like the laser source 410 in the right arm 310, the laser source 410D emits the laser beam LB. The laser source 410D corresponds to the light source 110 described in the context of the first embodiment.

Like the condensing lens 420 in the right arm 310, the condensing lens 420D condenses the laser beam LB to generate the illumination light IB. The condensing lens 420D corresponds to the optical condenser 120 described in the context of the first embodiment.

Like the liquid crystal panel 430 in the right arm 310, the liquid crystal panel 430D uses a CGH to diffract the illumination light IB and generate the diffracted light DFL. The liquid crystal panel 430D corresponds to the spatial light modulator 130 described in the context of the first embodiment.

Like the control circuit 440 in the right arm 310, the control circuit 440D controls the laser source 410D and the liquid crystal panel 430D. The laser source 410D emits the laser beam LB under control of the control circuit 440D. The liquid crystal panel 430D displays the CGH under control of the control circuit 440D. The control circuit 440D corresponds to the driving portion 140 described in the context of the first embodiment.

Like the liquid crystal panel 430 in the right arm 310, the liquid crystal panel 430D is inclined from the optical path defined between the laser source 410D and the liquid crystal panel 430D. Therefore, an angle of diffraction required for the liquid crystal panel 430D is smaller than the first embodiment. In short, the observer may observe an image at a wide angle of view even under a small angle of diffraction caused by the liquid crystal panel 430D.

Like the communicator 444 in the right arm 310, the communicator 444D is used for communicating information with an external device (not shown). For example, the communicator 444D may be configured to make wireless communication with a server on the Internet. Alternatively, the communicator 444D may be connectable to a communication network used by mobile terminals such as cellular phones. Further alternatively, the communicator 444D may be used for connection to a device in a short distance (e.g. Wi-Fi). Further alternatively, the communicator 444D may be connected by wire to a terminal device including a wireless communication function and/or an Internet connection function. The principle of this embodiment is not limited by communication techniques between the communicator 444D and the external device at all.

If the communicator 444D acquires image data from the external device, the communicator 444D corresponds to the acquisition portion 144 described in the context of the first embodiment. In this case, the communicator 444D outputs the image data to the control circuit 440D. The control circuit 440D calculates a diffraction pattern according to the image data. A CGH is displayed by the liquid crystal panel 430D according to the diffraction pattern.

Like the battery 470 in the right arm 310, the battery 470D supplies electric power to the laser source 410D, the liquid crystal panel 430D, the control circuit 440D and the communicator 444D. The battery 470D may be chargeable. In this case, the battery 470D may be charged while the HMD 300D is not used. Alternatively, the battery 470D does not have to be chargeable.

Like the fifth embodiment, the left arm 320D includes a proximal end 322 connected to the screen 330 and a distal end 323 opposite to the proximal end 322. The laser source 410D, the condensing lens 420D, the liquid crystal panel 430D, the control circuit 440D, the communicator 444D and the battery 470D are aligned sequentially from the proximal end 322 to the distal end 323. In this case, the battery 470D may be heavier than the laser source 410D, the condensing lens 420D, the liquid crystal panel 430D, the control circuit 440D and the communicator 444D. The weight of the battery 470D contributes to holding the screen 330 in front of the eyes.

Like the fifth embodiment, the screen 330D may include the right screen 331 and the right reflection mirror 333. The screen 330D further includes a left screen 332D situated in front of the left eyeball LEB.

The screen 330D further includes a left reflection mirror 333D formed in the left screen 332D. The left screen 332 does not prevent light traveling from a space in front of the screen 330D to the left eyeball LEB. The left reflection mirror 333D allows transmission of a part of the light traveling from the space in front of the screen 330D to the left eyeballs LEB. Therefore, the observer may visually recognize a scene of the space in front of the screen 330D with the left eyeball LEB.

The diffracted light DFL emitted from the emission window 311 enters the left reflection mirror 333D. The left reflection mirror 333D reflects the diffracted light DFL. Therefore, the diffracted light DFL enters the left pupil LPL. The diffracted light DFL is then focused on the retina of the left eyeball LEB. Therefore, the observer may perceive an image represented by the diffracted light DFL. The left reflection mirror 333D may have the same optical characteristics as the right reflection mirror 333.

The diffracted light DFL emitted from the emission window 311 represents an image observed by the right eyeball REB. The diffracted light DFL emitted from the emission window 311D represents an image observed by the left eyeball LEB. Therefore, the observer may observe an image with both eyes. The image observed by the left eyeball LEB may be the same as or may be different from the image observed by the right eyeball REB. The principle of this embodiment is not limited by the images observed by the observer at all.

In this embodiment, the image observed by the left eye is generated under control of the control circuit 440D. The image observed by the right eye is generated under control of the control circuit 440. Alternatively, the images observed by the left and right eyes may be generated under control of a common control circuit. In this case, the HMD is built with a small number of components. In addition, the HMD may be inexpensively manufactured. The HMD becomes lightweight.

<Seventh Embodiment>

Aberration of light used for image display degrades an image. Reduction techniques for aberration using a dimmer filter are described in the seventh embodiment.

Figure 15:
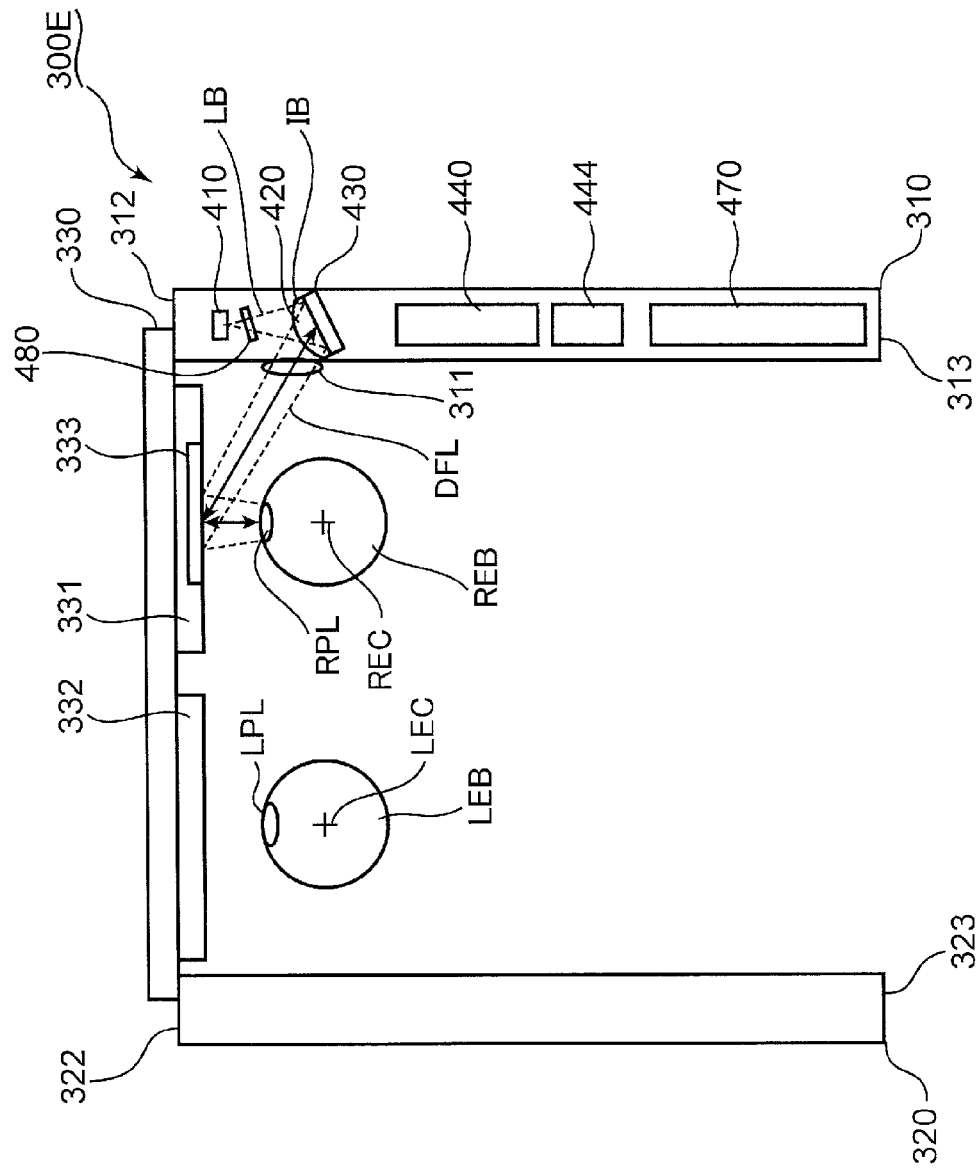
FIG. 15 is a schematic view of an HMD according to the seventh embodiment.

FIG. 15 is a schematic view of the HMD 300E according to the seventh embodiment. The HMD 300E is described with reference to FIG. 15. The HMD 300E is exemplified as the display device. Reference numerals used in common between the fifth and seventh embodiments mean that components denoted by the common reference numerals have the same functions as the fifth embodiment. Therefore, the description in the fifth embodiment is applied to these components.

Like the fifth embodiment, the HMD 300E includes the screen 330, the right arm 310, the left arm 320, the laser source 410, the condensing lens 420, the liquid crystal panel 430 (a reflective type), the control circuit 440, the communicator 444 and the battery 470. The HMD 300D further includes a dimmer filter 480 (an ND filter). The dimmer filter 480 is situated between the laser source 410 and the condensing lens 420.

Figure 16:
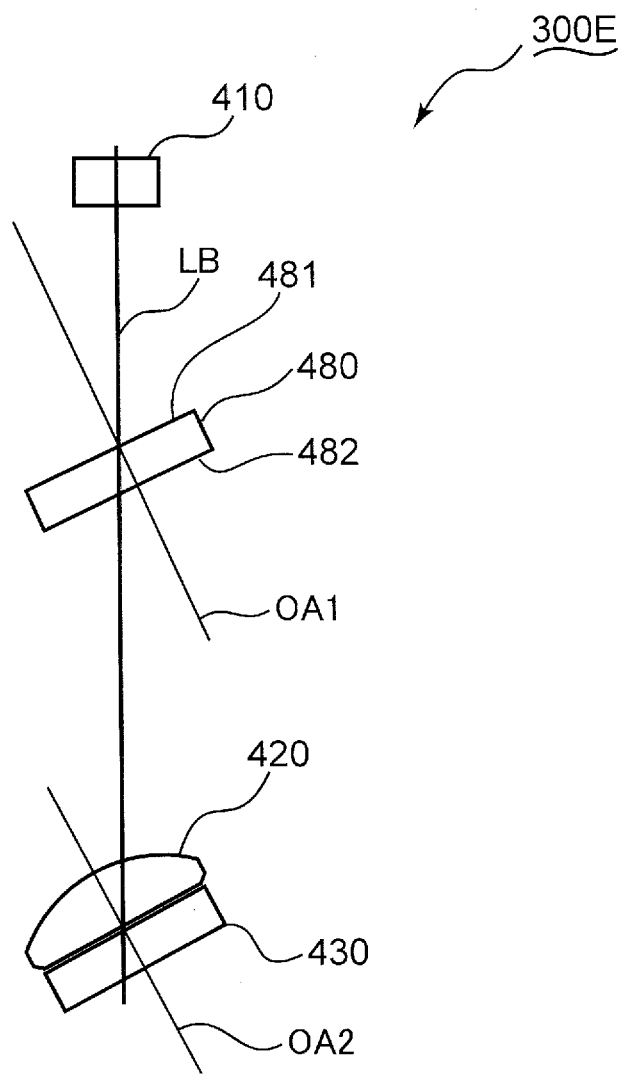
FIG. 16 is a schematic enlarged view of the HMD shown in FIG. 15.

FIG. 16 is a schematic enlarged view of the HMD 300E around the dimmer filter 480. A reduction in aberration is described with reference to FIG. 16.

The laser beam LB emitted from the laser source 410 passes through the dimmer filter 480. The laser beam LB then passes through the condensing lens 420. The dimmer filter 480 reduces intensity of the laser beam LB. In this embodiment, the dimmer filter 480 is exemplified as the attenuation filter.

The dimmer filter 480 includes an incident end surface 481 and an emission end surface 482 opposite to the incident end surface 481. The laser beam LB enters the incident end surface 481. The laser beam LB having intensity lower than the intensity of the laser beam LB entering the incident end surface 481 is emitted from the emission end surface 482.

FIG. 16 shows the optical axis OA1 of the dimmer filter 480 and the optical axis OA2 of the condensing lens 420 and the liquid crystal panel 430. Both of the optical axes OA1, OA2 are inclined from an optical path of the laser beam LB. Since the optical axis OA2 is inclined from the optical path of the laser beam LB, aberration is caused by the incidence of the laser beam LB on the condensing lens 420. However, since the inclined dimmer filter 480 is situated in front of the condensing lens 420, the resultant aberration from the incidence of the laser beam LB on the inclined condensing lens 420 is reduced.

<Eighth Embodiment>

Improvement of diffraction efficiency results in improvement of image quality. Techniques for improving the diffraction efficiency are described in the eighth embodiment.

Figure 17:
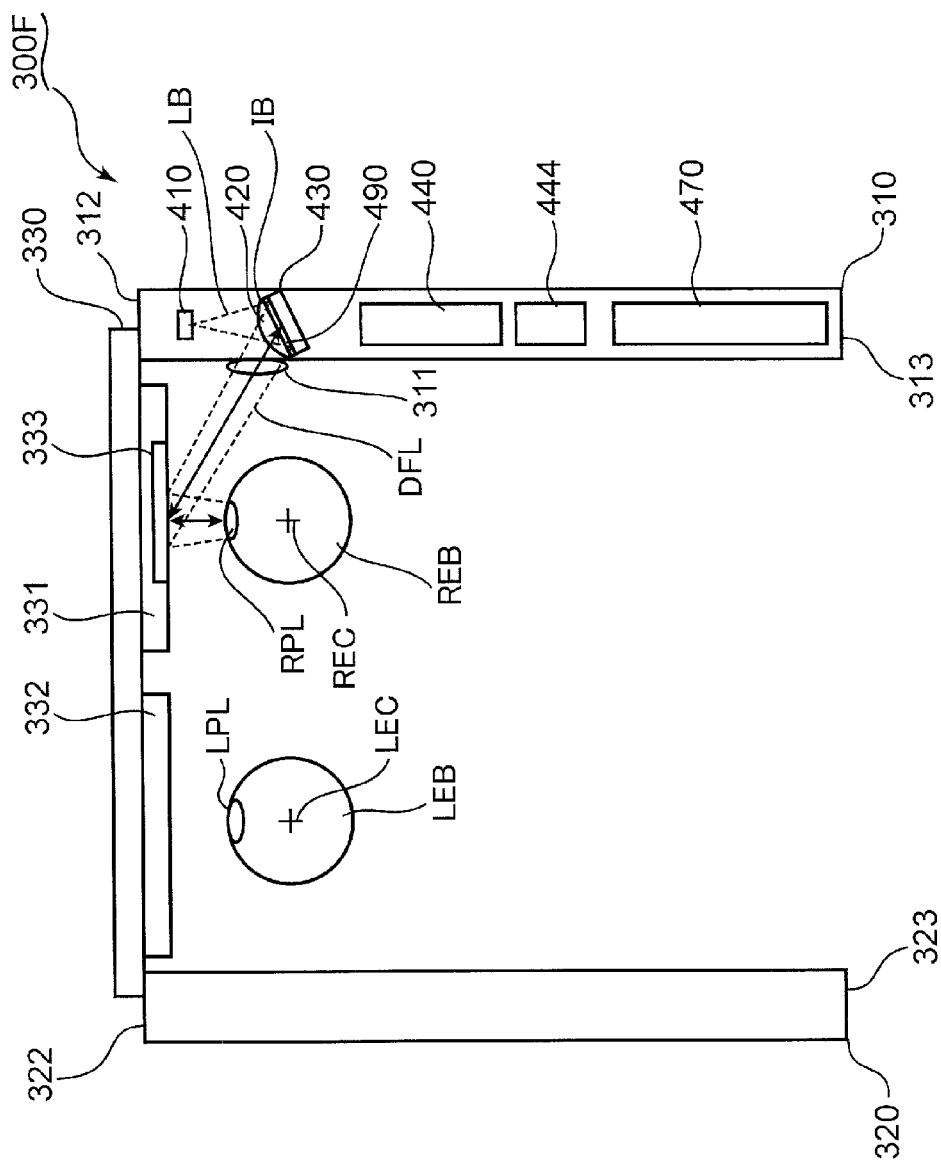
FIG. 17 is a schematic view of an HMD according to the eighth embodiment.

FIG. 17 is a schematic view of the HMD 300F according to the eighth embodiment. The HMD 300F is described with reference to FIG. 17. The HMD 300F is exemplified as the display device. Reference numerals used in common between the fifth and eighth embodiments mean that components denoted by the common reference numerals have the same functions as the fifth embodiment. Therefore, the description in the fifth embodiment is applied to these components.

Like the fifth embodiment, the HMD 300F includes the screen 330, the right arm 310, the left arm 320, the laser source 410, the condensing lens 420, the liquid crystal panel 430 (a reflective type), the control circuit 440, the communicator 444 and the battery 470. The HMD 300F further includes a polarizing plate 490. The polarizing plate 490 is situated between the condensing lens 420 and the liquid crystal panel 430.

Figure 18:
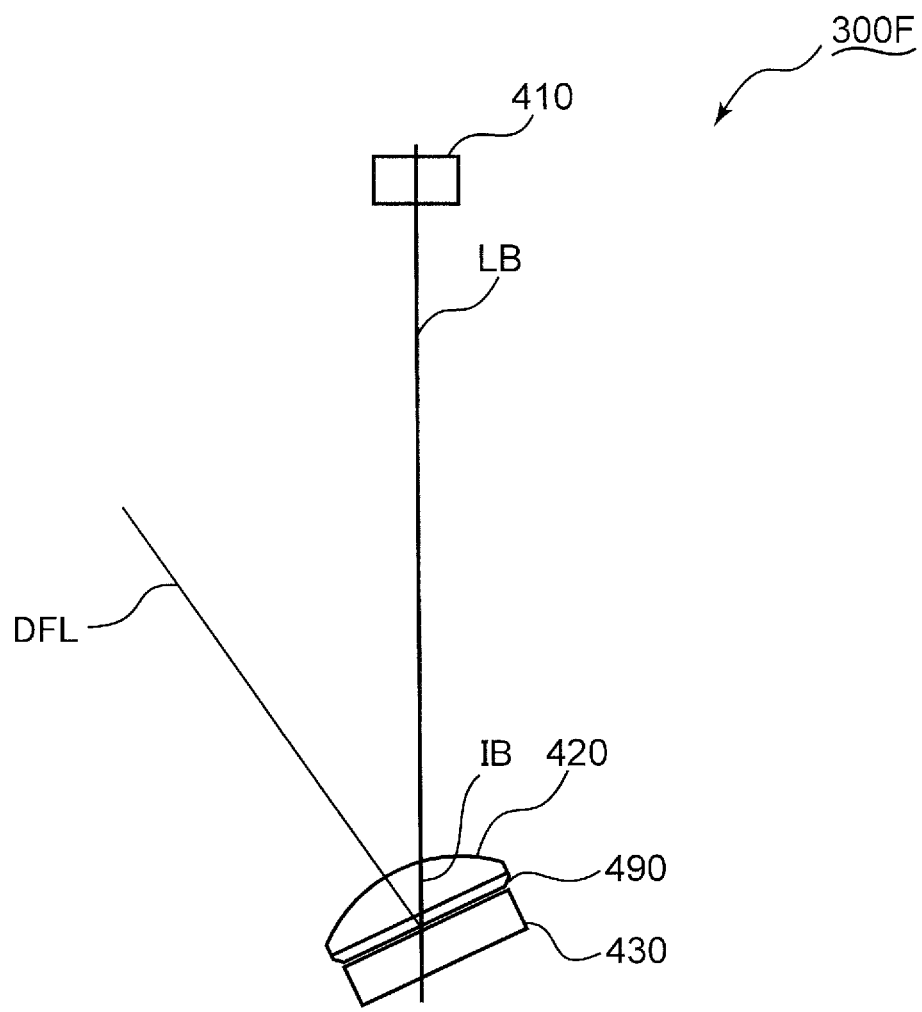
FIG. 18 is a schematic enlarge view of the HMD shown in FIG. 17.

FIG. 18 is a schematic enlarged view of the HMD 300F around the polarizing plate 490. Techniques for increasing the diffraction efficiency are described with reference to FIG. 18.

The polarizing plate 490 adjusts polarization of the illumination light IB to increase the diffraction efficiency in the liquid crystal panel 430. Accordingly, the liquid crystal panel 430 may efficiently generate the diffracted light DFL.

<Ninth Embodiment>

In the eighth embodiment, the polarizing plate is situated between the condensing lens and the liquid crystal panel. However, the polarizing plate may be situated in another position. The other arrangement of the polarizing plate is described in the ninth embodiment.

Figure 19:
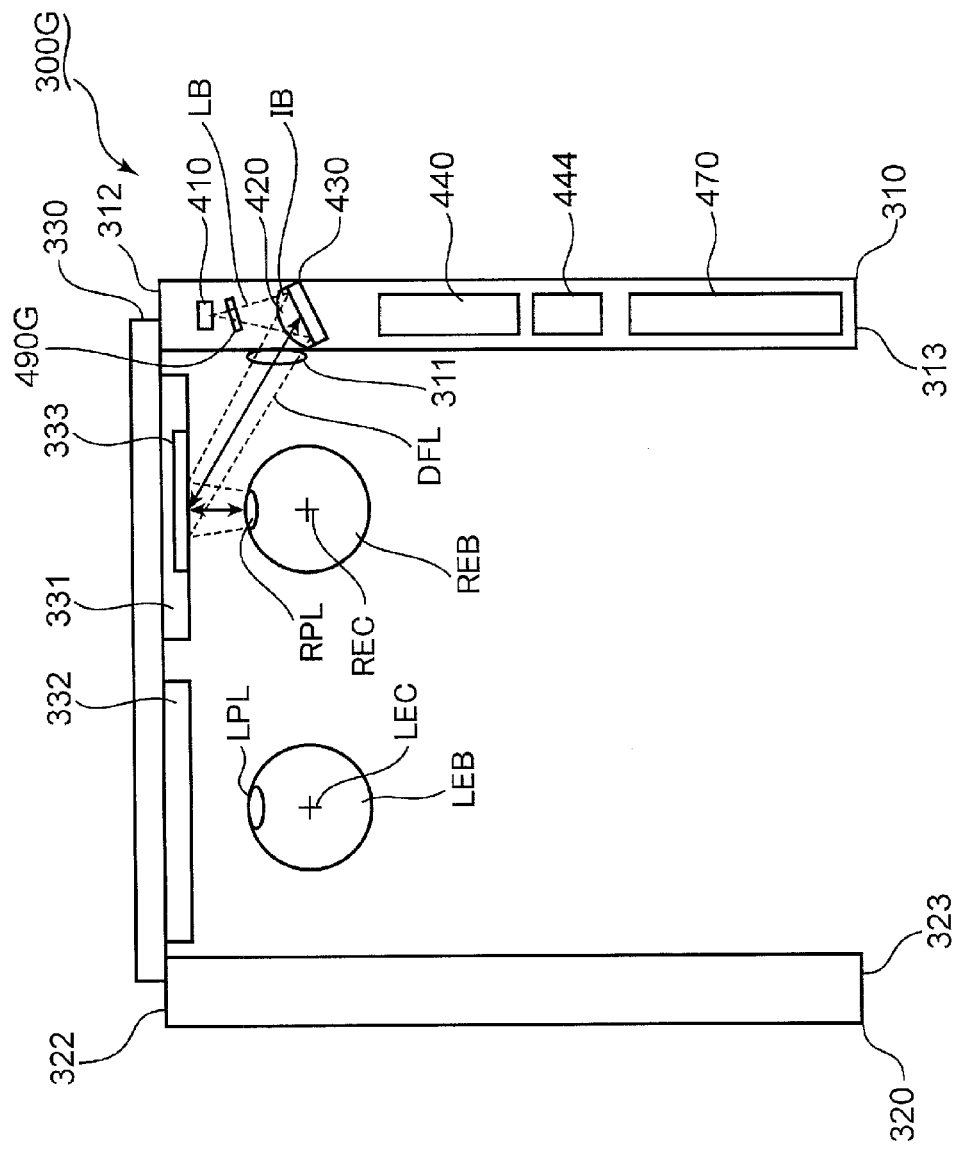
FIG. 19 is a schematic view of an HMD according to the ninth embodiment.

FIG. 19 is a schematic view of the HMD 300G according to the ninth embodiment. The HMD 300G is described with reference to FIG. 19. The HMD 300G is exemplified as the display device. Reference numerals used in common between the fifth and ninth embodiments mean that components denoted by the common reference numerals have the same functions as the fifth embodiment. Therefore, the description in the fifth embodiment is applied to these components.

Like the fifth embodiment, the HMD 300G includes the screen 330, the right arm 310, the left arm 320, the laser source 410, the condensing lens 420, the liquid crystal panel 430 (a reflective type), the control circuit 440, the communicator 444 and the battery 470. The HMD 300G further includes a polarizing plate 490G. The polarizing plate 490G is situated between the laser source 410 and the condensing lens 420.

Figure 20:
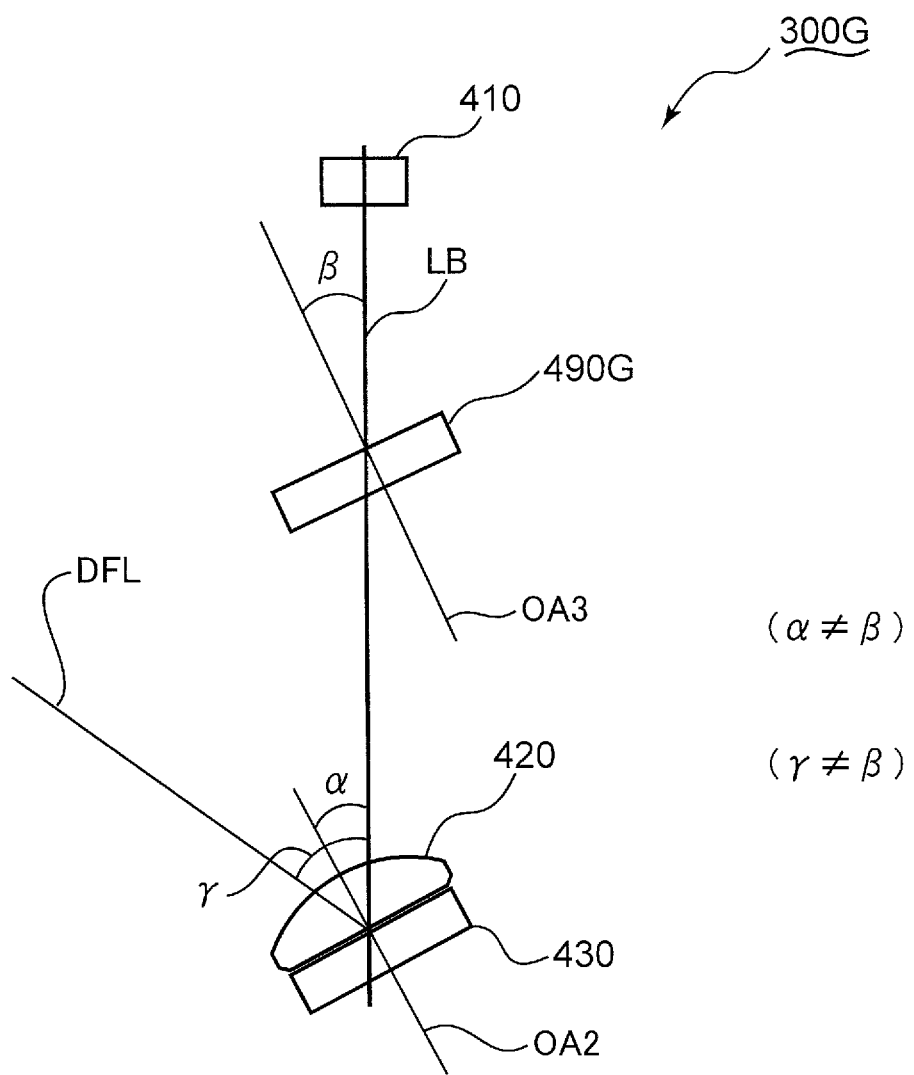
FIG. 20 is a schematic enlarged view of the HMD shown in FIG. 19.

FIG. 20 is a schematic enlarged view of the HMD 300G around the polarizing plate 490G. A reduction in aberration is described with reference to FIG. 20.

The laser beam LB emitted from the laser source 410 passes through the polarizing plate 490G The polarizing plate 490G adjusts polarization of the laser beam LB to improve diffraction efficiency in the liquid crystal panel 430.

FIG. 20 shows the optical axis OA2 of the condensing lens 420 and the liquid crystal panel 430 and the optical axis OA3 of the polarizing plate 490G. FIG. 20 further shows the inclination angle $\alpha$ of the optical axis OA200 from the optical path of the laser beam LB and the inclination angle $\beta$ of the optical axis OA3 from the optical path of the laser beam LB. As shown in FIG. 20, the inclination angle $\alpha$ is different from the inclination angle $\beta$.

FIG. 20 shows the angle $\gamma$ between the optical paths of the laser beam LB and the diffracted light DFL. As shown in FIG. 20, the angle $\gamma$ is different from the inclination angle $\beta$.

If the aforementioned angular conditions are satisfied, an observer is less likely to perceive a noise image caused by unnecessary light resultant from surface reflection of the polarizing plate 490E <Tenth Embodiment>

The aforementioned various HMDs use the reflective spatial light modulator to generate diffracted light. However, the principle described in the context of the third and fourth embodiments makes it possible to use a transmissive spatial light modulator as well. An HMD including the transmissive spatial light modulator is described in the tenth embodiment.

Figure 21:
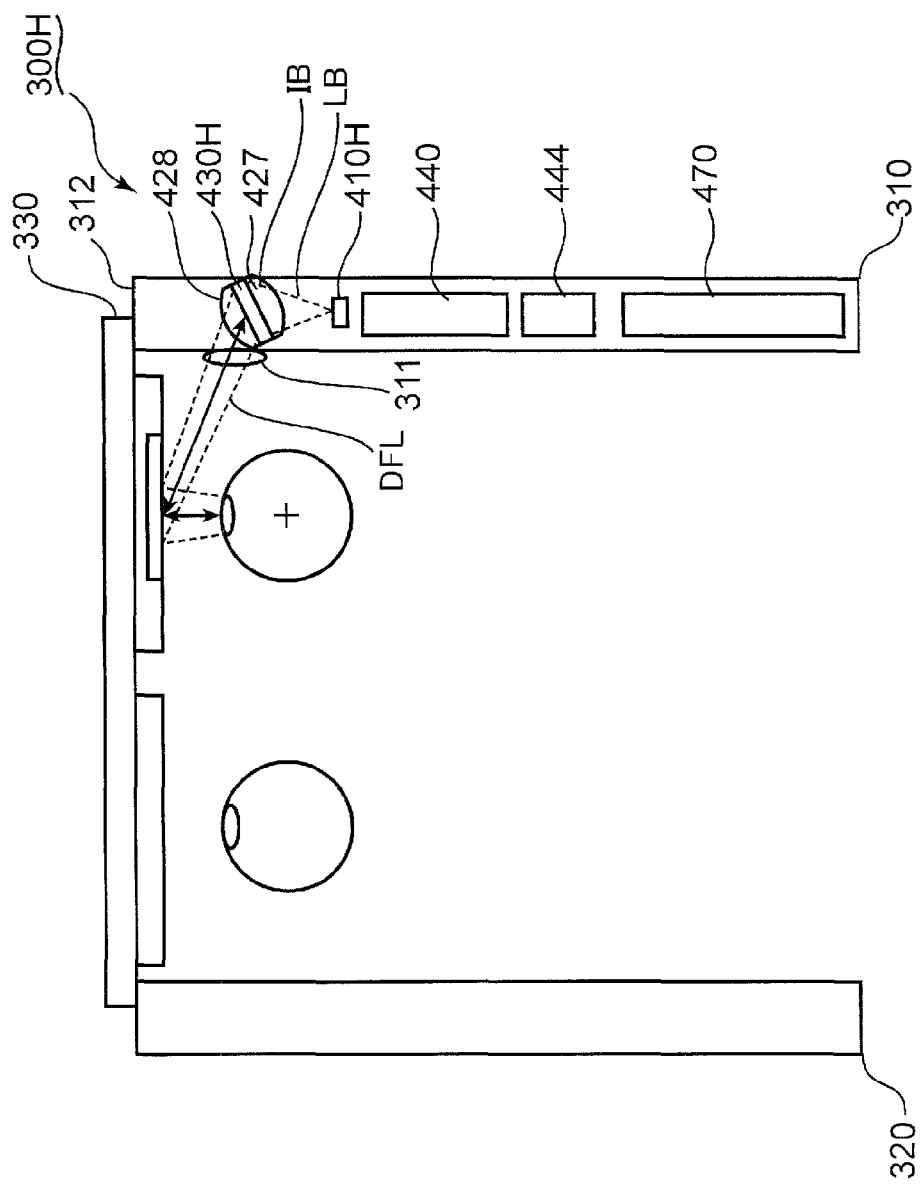
FIG. 21 is a schematic view of an HMD according to the tenth embodiment.

FIG. 21 is a schematic view of the HMD 300H according to the tenth embodiment. The HMD 300H is described with reference to FIGS. 10 and 21. The HMD 300H is exemplified as the display device. Reference numerals used in common between the fifth and tenth embodiments mean that components denoted by the common reference numerals have the same functions as the fifth embodiment. Therefore, the description in the fifth embodiment is applied to these components.

Like the fifth embodiment, the HMD 300H includes the screen 330, the right arm 310, the left arm 320, the control circuit 440, the communicator 444 and the battery 470. The HMD 300H further includes a laser source 410H, a first condensing lens 427, a second condensing lens 428 and a liquid crystal panel 430H (a transmissive type). The laser source 410H corresponds to the light source 110 described in the context of the fourth embodiment. The first condensing lens 427 corresponds to the first optical condenser 127 described in the context of the fourth embodiment. The second condensing lens 428 corresponds to the second optical condenser 128 described in the context of the fourth embodiment.

The laser source 410H, the first condensing lens 427, the second condensing lens 428 and the liquid crystal panel 430H are stored in the right arm 310. The second condensing lens 428 between the liquid crystal panel 430H and the proximal end 312 of the right arm 310 is situated near the emission window 311 of the right arm 310. The first condensing lens 427 situated near the liquid crystal panel 430H is arranged between the liquid crystal panel 430H and the laser source 410H. The laser source 410H is situated between the first condensing lens 427 and the control circuit 440.

The laser source 410H emits the laser beam LB toward the first condensing lens 427. The first condensing lens 427 condenses the laser beam LB toward the liquid crystal panel 430H to generate the illumination light TB. The liquid crystal panel 430H allows passage of the illumination light IB to generate the diffracted light DFL. The diffracted light DFL passes through the second condensing lens 428 and is emitted from the emission window 311.

While the diffracted light DFL passes through the second condensing lens 428, the diffracted light DFL receives condensing action from the second condensing lens 428. However, the control circuit 440 sets a CGH on the liquid crystal panel 430H so that the diffracted light DFL passing through the second condensing lens 428 becomes collimated or divergent light. Therefore, an observer may appropriately observe an image rendered by the diffracted light DFL.

<Eleventh Embodiment>

An observer may use an HMD and a communication device capable of communicating with the HMD to observe an image. A display device including the HMD and the communication device is described in the eleventh embodiment.

Figure 22:
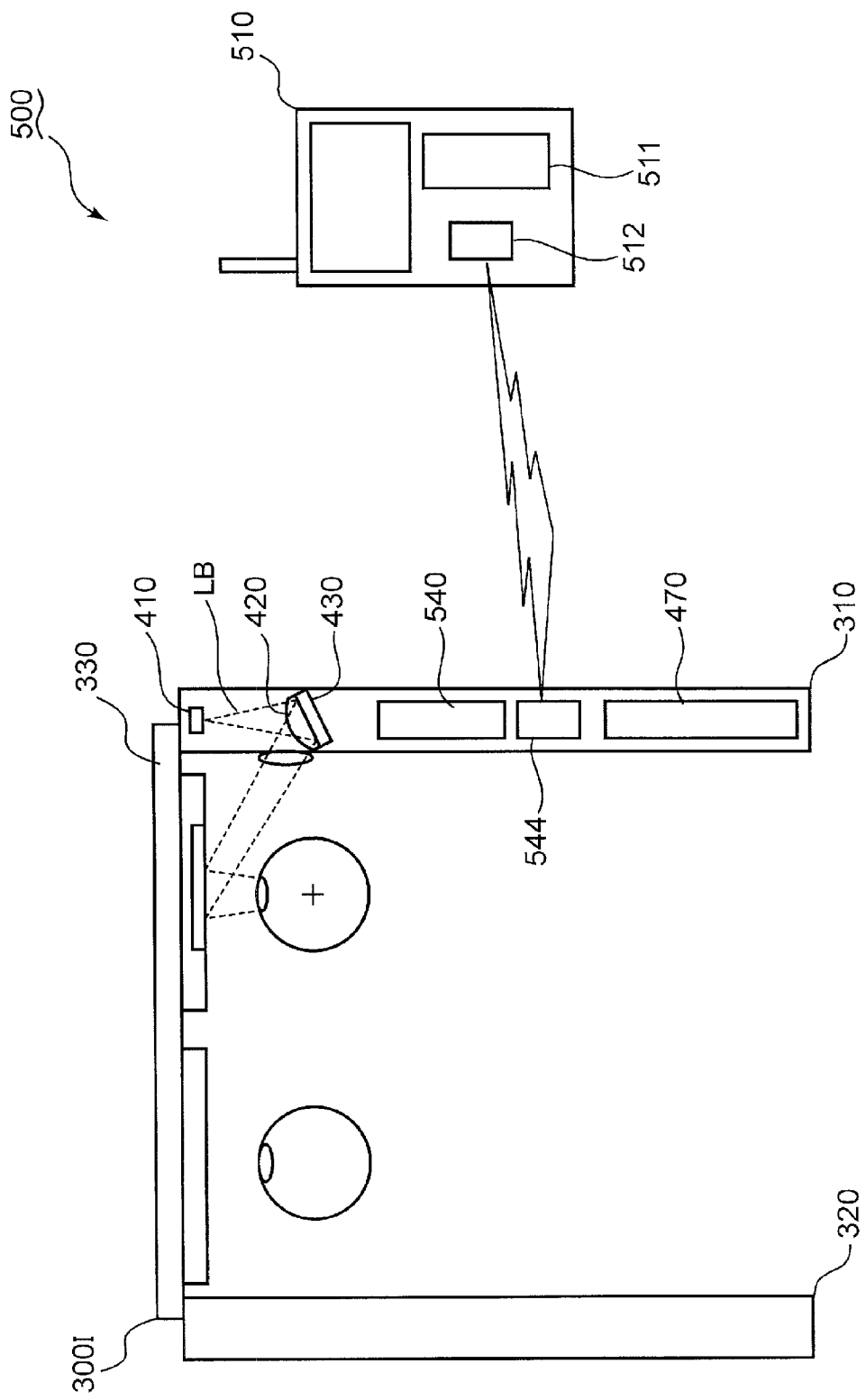
FIG. 22 is a schematic view of a display device according to the eleventh embodiment.

FIG. 22 is a schematic view of the display device 500 according to the eleventh embodiment. The display device 500 is described with reference to FIGS. 5 and 22. Reference numerals used in common between the fifth and eleventh embodiments mean that components denoted by the common reference numerals have the same functions as the fifth embodiment. Therefore, the description in the fifth embodiment is applied to these components.

The display device 500 includes an HMD 3001 and a terminal device 510. The HMD 3001 may make wireless communication with the terminal device 510 to display an image.

Like the fifth embodiment, the HMD 3001 includes the screen 330, the right arm 310, the left arm 320, the laser source 410, the condensing lens 420, the liquid crystal panel 430 (a reflective type) and the battery 470. The HMD 3001 further includes a first control circuit 540 and a first communicator 544.

The terminal device 510 includes a second control circuit 511 and a second communicator 512. The second control circuit 511 may execute step S110 to step S140 described with reference to FIG. 5. Calculation results obtained from the execution of the processes from step S110 to step S140 are output from the second control circuit 511 to the second communicator 512. The second communicator 512 transmits the calculation results to the first communicator 544.

The first communicator 544 receives the calculation results. The calculation results are then output from the first communicator 544 to the first control circuit 540. The first control circuit 540 may execute step S150 described with reference to FIG. 5. As a result of the execution of step S150, the first control circuit 540 generates second driving signals for driving the liquid crystal panel 430. The liquid crystal panel 430 displays a CGH in response to the second driving signals. The first control circuit 540 also generates first driving signals for driving the laser source 410. The laser source 410 emits the laser beam LB in response to the first driving signals. Accordingly, the observer may observe an image.

The first communicator 544 may have the same communication functions as the second communicator 512. Alternatively, the first communicator 544 may have communication functions different from the second communicator 512. For example, the first communicator 544 may perform only wireless communication at a short distance whereas the second communicator 512 may have functions of connecting with a wireless communication network at a long distance. In this case, power consumption of the HMD 3001 becomes very small.

The terminal device 510 may be a cellular phone or a smart phone. Alternatively, the terminal device 510 may be other mobile devices.

<Twelfth Embodiment>

In the eleventh embodiment, the HMD performs wireless communication with the communication device. However, the HMD may communicate with the communication device through a cable. A display device including an HMD configured to communicate with a communication device through a cable is described in the twelfth embodiment.

Figure 23:
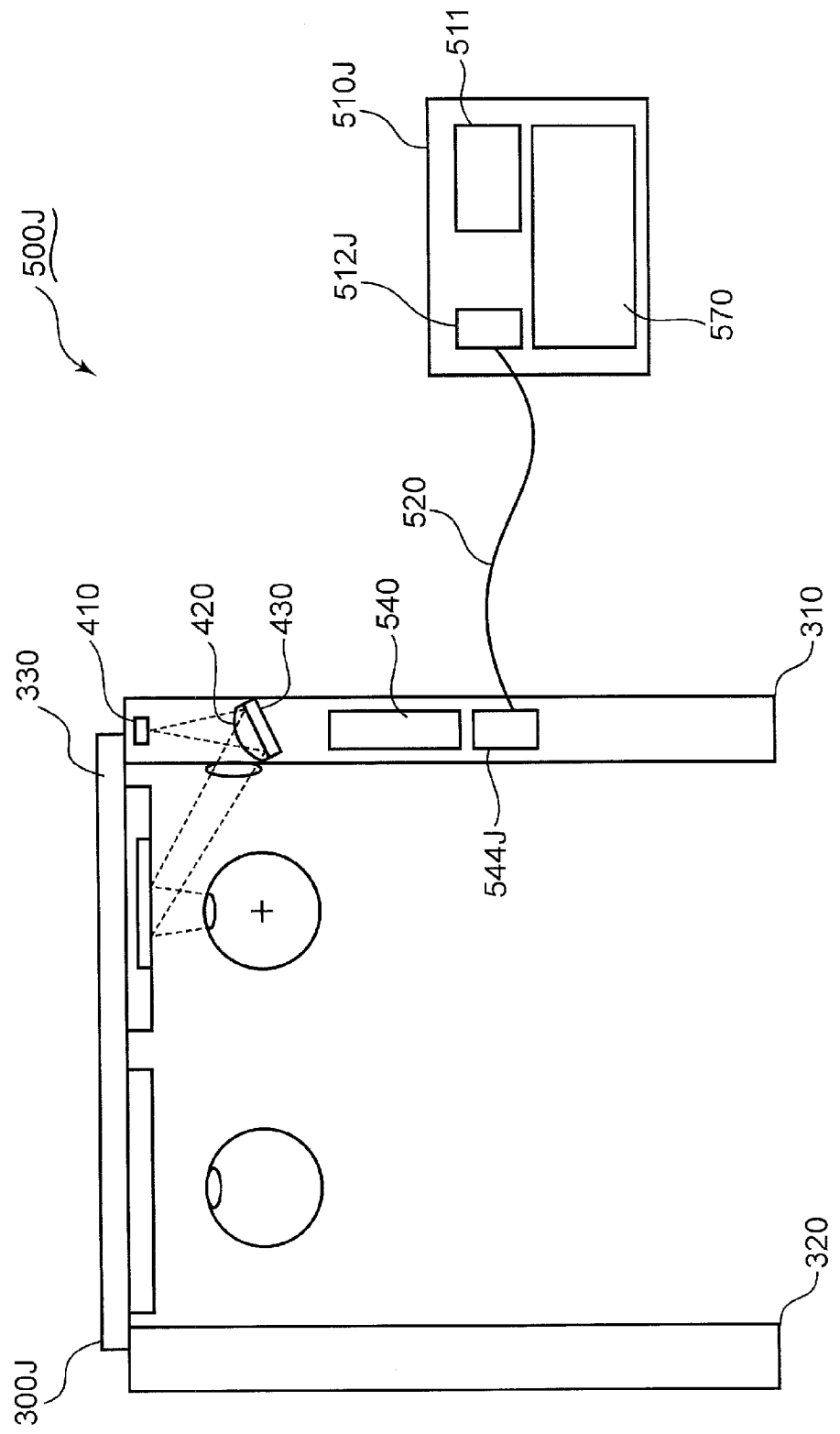
FIG. 23 is a schematic view of a display device according to the twelfth embodiment.
Figure 24A:
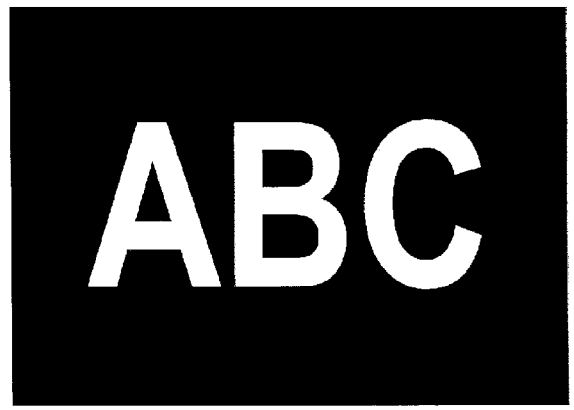
FIG. 24A is an exemplary image represented by image data input to a computer.
Figure 24B:
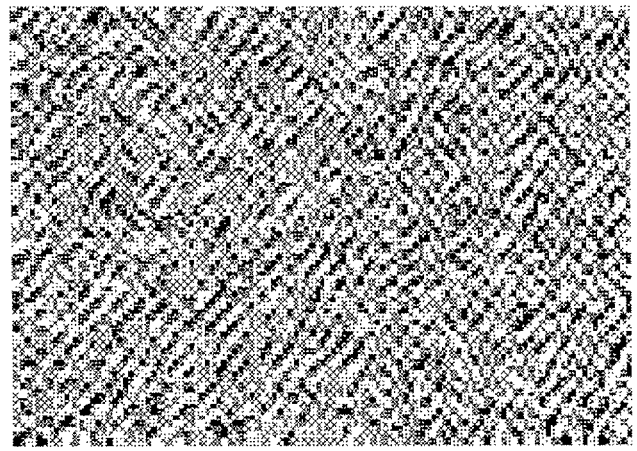
FIG. 24B is an exemplary diffraction pattern in correspondence to the image data shown in FIG. 24A.
Figure 25:
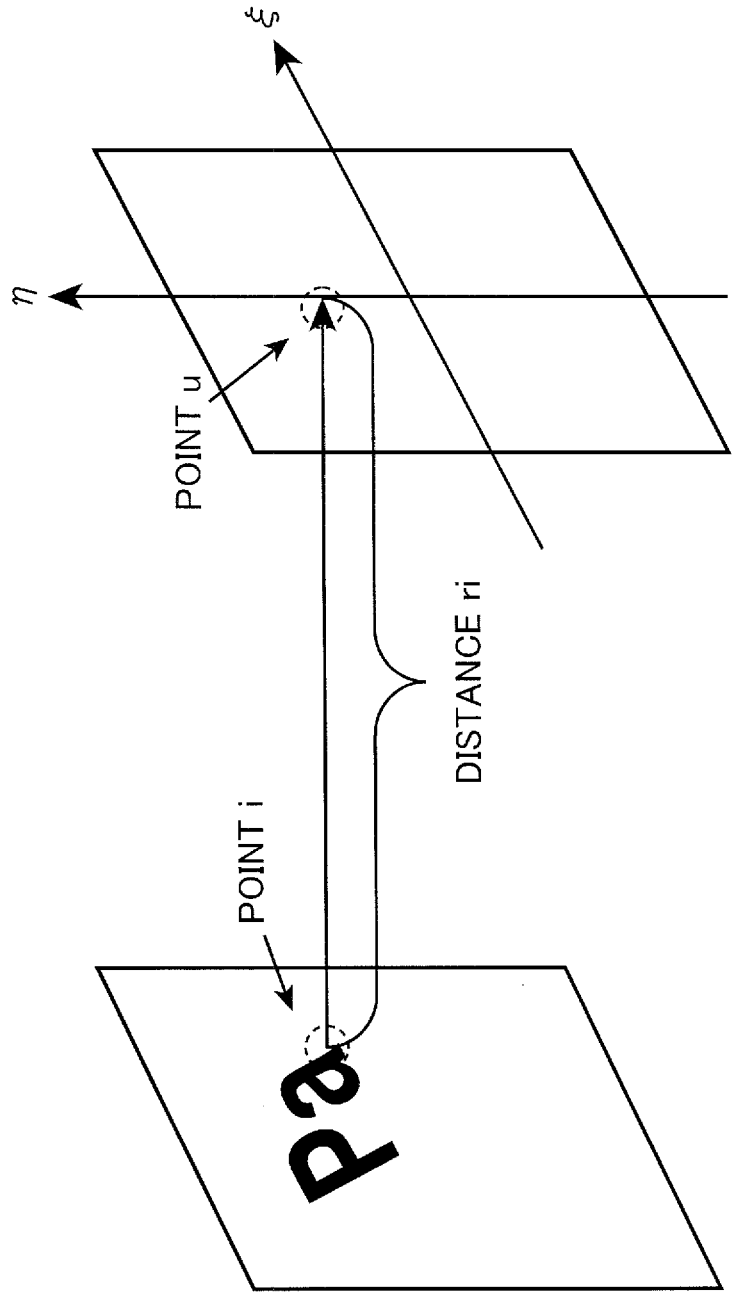
FIG. 25 is a conceptual view of a generation method for a diffraction pattern according to the point filling method.
Figure 28:
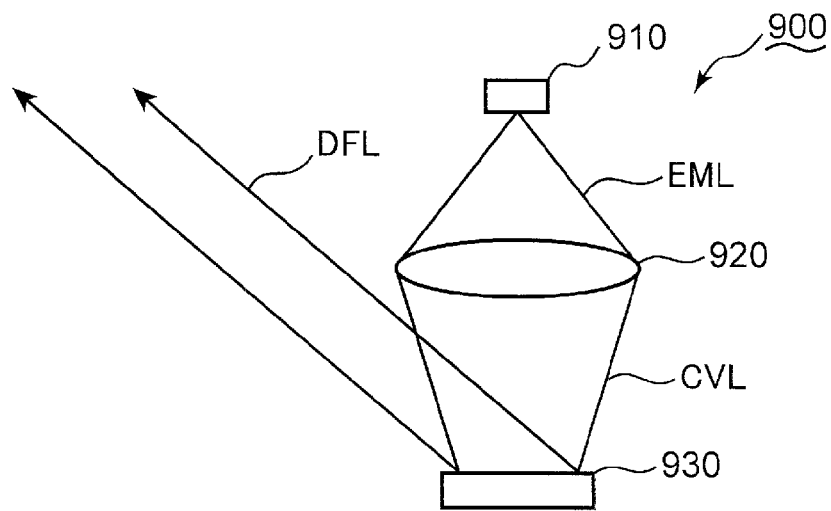
FIG. 28 is a schematic view of an optical system configured to generate convergent light.
Figure 29:
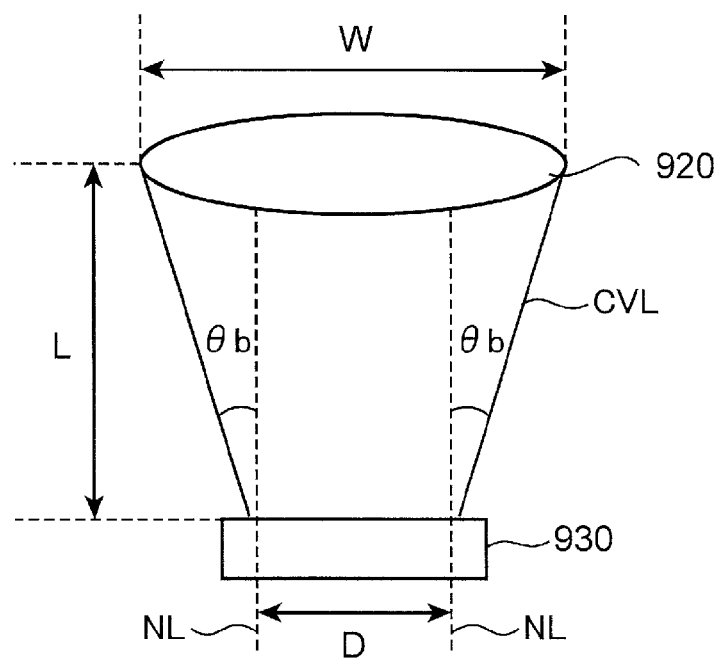
FIG. 29 is a schematic view showing a relationship of sizes between a condensing lens and a liquid crystal panel.

FIG. 23 is a schematic view of the display device 500J according to the twelfth embodiment. The display device 500J is described with reference to FIGS. 5 and 23. Reference numerals used in common between the eleventh and twelfth embodiments mean that components denoted by the common reference numerals have the same functions as the eleventh embodiment. Therefore, the description in the eleventh embodiment is applied to these components.

The display device 500J includes an HMD 300J, a terminal device 510J and a cable 520. The HMD 300J may communicate information with the terminal device 510J through the cable 520 to display an image.

Like the eleventh embodiment, the HMD 300J includes the screen 330, the right arm 310, the left arm 320, the laser source 410, the condensing lens 420, the liquid crystal panel 430 (a reflective type) and the first control circuit 540. The HMD 300J further includes a first communicator 544J.

Like the eleventh embodiment, the terminal device 510J includes the second control circuit 511. The terminal device 510J further includes a second communicator 512J and a battery 570. The cable 520 is used for electrically connecting the first communicator 544J to the second communicator 512J.

The second control circuit 511 may execute step S110 to step S140 described with reference to FIG. 5. Calculation results obtained from the execution of the processes from step S110 to step S140 are output from the second control circuit 511 to the second communicator 512J. The second communicator 512J transmits the calculation results to the first communicator 544J through the cable 520.

The first communicator 544J receives the calculation results. The calculation results are then output from the first communicator 544J to the first control circuit 540. The first control circuit 540 may execute step S150 described with reference to FIG. 5. As a result of the execution of step S150, the first control circuit 540 generates second driving signals for driving the liquid crystal panel 430. The liquid crystal panel 430 displays a CGH in response to the second driving signals. The first control circuit 540 generates first driving signals for driving the laser source 410. The laser source 410 emits the laser beam LB in response to the first driving signals. Accordingly, an observer may observe an image.

The cable 520 supplies electric power stored in the battery 570 from the second communicator 512J to the first communicator 544J. The electric power is then supplied to the first control circuit 540, the liquid crystal panel 430 and the laser source 410.

Unlike the eleventh embodiment, the battery 570 belongs to the terminal device 510J. Therefore, the HMD 300J is reduced in size. Accordingly, the observer may comfortably wear the HMD 300J.

The terminal device 510J may be a terminal of a tablet type or may be a server terminal on a network.

The principles of the aforementioned various embodiments may be combined. Various display devices may be designed on the basis of the principles of the various embodiments. Therefore, the principles of the various embodiments include improvements, changes, and omitted design of the various display devices.

The aforementioned embodiments mainly include the following configurations.

A display device according to one aspect of the aforementioned embodiments includes: a pattern generator configured to generate a diffraction pattern from an image; a light source configured to emit emission light; an optical condenser which condenses the emission light to generate illumination light; and a spatial light modulator which diffracts the illumination light according to the diffraction pattern to generate diffracted light. The diffracted light passes through the optical condenser.

According to the aforementioned configuration, a sufficiently short distance is set between the optical condenser and the spatial light modulator so that the diffracted light passes through the optical condenser. Therefore, the display device may use a small optical system to display an image.

In the aforementioned configuration, the spatial light modulator may reflect the illumination light to generate the diffracted light.

According to the aforementioned configuration, a sufficiently short distance is set between the optical condenser and the spatial light modulator so that the diffracted light reflected from the spatial light modulator passes through the optical condenser. Therefore, the display device may use a small optical system to display an image.

In the aforementioned configuration, the display device may further include a reflector configured to reflect the diffracted light resultant from transmission through the spatial light modulator. The diffracted light which is reflected by the reflector may pass through the optical condenser.

According to the aforementioned configuration, a sufficiently short distance is set between the optical condenser and the spatial light modulator so that the diffracted light reflected from the reflector passes through the optical condenser. Therefore, the display device may use a small optical system to display an image.

In the aforementioned configuration, the optical condenser may include a first optical condenser, which condenses the emission light, and a second optical condenser, which condenses the diffracted light resultant from transmission through the spatial light modulator.

According to the aforementioned configuration, the display device may display an image with little optical loss resultant from reflection.

In the aforementioned configuration, the spatial light modulator may include a display surface configured to receive the illumination light. The optical condenser may be situated next to the display surface.

According to the aforementioned configuration, since the optical condenser is situated next to the display surface, a sufficiently short distance is set between the optical condenser and the spatial light modulator. Therefore, the display device may use a small optical system to display an image.

In the aforementioned configuration, the optical condenser may include a planoconvex lens.

According to the aforementioned configuration, if the planoconvex lens is used as the optical condenser, the display device may display an image under small aberration.

In the aforementioned configuration, the spatial light modulator may emit the diffracted light and non-diffracted light which fails to be diffracted by the spatial light modulator. The non-diffracted light may be convergent light. The pattern generator may generate the diffraction pattern so that the diffracted light emitted by the spatial light modulator at least partially becomes collimated or divergent light.

According to the aforementioned configuration, the spatial light modulator may partially convert the illumination light into the diffracted light. In this case, not only the diffracted light but also the non-diffracted light is emitted from the spatial light modulator. The non-diffracted light is the convergent light whereas the diffracted light is at least partially collimated or divergent light. Since the non-diffracted light is condensed by the optical condenser, an observer is less likely to perceive the non-diffracted light. The observer may perceive the diffracted light passing through the optical condenser as an image since the diffracted light is at least partially collimated or divergent light.

In the aforementioned configuration, the image may include a first region and a second region different in a position from the first region. The pattern generator may generate a first diffraction pattern in correspondence to the first region and a second diffraction pattern in correspondence to the second region as the diffraction pattern. The first diffraction pattern may cause optical action different from optical action of the second diffraction pattern.

According to the aforementioned configuration, the display device generates the diffraction patterns different in the optical action according to regions of an image. Therefore, the display device may display a high quality image.

In the aforementioned configuration, the display device may further include an attenuation filter configured to attenuate intensity of the emission light between the light source and the optical condenser. The attenuation filter may be inclined from an optical path of the emission light.

According to the aforementioned configuration, since the attenuation filter is inclined from the optical path of the emission light, the display device may display an image under small aberration.

In the aforementioned configuration, the display device may further include a polarizing plate configured to adjust polarization of the emission or illumination light.

According to the aforementioned configuration, if the display device includes the polarizing plate, the display device may display an image with little stray light.

In the aforementioned configuration, the polarizing plate may be inclined from an optical axis of the optical condenser.

According to the aforementioned configuration, if the polarizing plate is inclined from the optical axis of the optical condenser, the display device may display an image with little stray light.

INDUSTRIAL APPLICABILITY

The principles of the aforementioned embodiments may be used for a display device configured to display an image. The principles of the aforementioned embodiments allow use of a small optical system. Therefore, the principles of the aforementioned embodiments are suitable for a wearable display device such as an HMD. An observer wearing the HMD fabricated on the basis of the principles of the aforementioned embodiments may perceive diffracted light, which is generated by the spatial light modulator, as an image. The principles of the aforementioned embodiments may be used for display systems, display methods, and design techniques for display devices.

The invention claimed is:

1. A display device comprising:
   a pattern generator configured to generate a diffraction pattern from an image;
   a light source configured to emit emission light;
   an optical condenser which condenses the emission light to generate illumination light;
   a spatial light modulator which diffracts the illumination light according to the diffraction pattern to generate diffracted light; and
   a reflector configured to reflect the diffracted light resultant from transmission through the spatial light modulator,
   wherein the diffracted light passes through the optical condenser, and
   wherein the diffracted light which is reflected by the reflector passes through the optical condenser.

* * * * *